United States Patent
Torii et al.

(10) Patent No.: US 6,789,443 B1
(45) Date of Patent: Sep. 14, 2004

(54) DRIVING APPARATUS EQUIPPED WITH MOTOR AND DECELERATING MECHANISM

(75) Inventors: Katsuhiko Torii, Hamamatsu (JP); Hiroaki Yamamoto, Kosai (JP); Shinji Oka, Toyohashi (JP)

(73) Assignee: Asmo Co., Ltd., Shizouka-Ken (JP)

( * ) Notice: Subject to any disclaimer, the term of this patent is extended or adjusted under 35 U.S.C. 154(b) by 0 days.

(21) Appl. No.: 09/762,153

(22) PCT Filed: Aug. 3, 1999

(86) PCT No.: PCT/JP99/04164

§ 371 (c)(1),
(2), (4) Date: Feb. 1, 2001

(87) PCT Pub. No.: WO00/08350

PCT Pub. Date: Feb. 17, 2000

(30) Foreign Application Priority Data

| | | |
|---|---|---|
| Aug. 3, 1998 | (JP) | 10-219050 |
| Dec. 22, 1998 | (JP) | 10-364594 |
| Apr. 16, 1999 | (JP) | 11-109491 |
| Jun. 2, 1999 | (JP) | 11-154799 |

(51) Int. Cl.$^7$ .............................. F16D 41/07; F16H 1/16
(52) U.S. Cl. ........................................ 74/425; 192/223.2
(58) Field of Search ........................... 74/425, 411.5; 192/223.2, 223; 310/89, 239

(56) References Cited

U.S. PATENT DOCUMENTS

| | | | | | |
|---|---|---|---|---|---|
| 2,211,788 A | * | 8/1940 | Lucht | ............................ | 74/425 |
| 2,479,019 A | * | 8/1949 | Ochtman | ..................... | 74/89.39 |
| 3,559,499 A | * | 2/1971 | Profet | ......................... | 74/411.5 |
| 3,873,066 A | * | 3/1975 | Opyrchal | ....................... | 188/83 |
| 4,673,836 A | * | 6/1987 | Akiyama et al. | ............ | 310/239 |
| 4,843,274 A | * | 6/1989 | Paisley | ........................ | 310/239 |

FOREIGN PATENT DOCUMENTS

| | | |
|---|---|---|
| JP | 62-84358 | 5/1987 |
| JP | 4-20403 | 9/1993 |
| JP | 07-071491 | 3/1995 |
| JP | 09-191608 | 7/1997 |
| JP | 11-001170 | 1/1999 |

OTHER PUBLICATIONS

International Search Report (PCT/JP99/04164).
International Preliminary Examination Report (PCT/JP99/04164).

* cited by examiner

Primary Examiner—William C. Joyce
(74) Attorney, Agent, or Firm—Patterson, Thuente, Skaar & Christensen, P.A.

(57) ABSTRACT

A driving apparatus is disclosed for driving a driven device such as a lifting mechanism (8) for moving up and down a windowpane (9). The driving apparatus comprises a motor (5) including a rotating shaft (13), and an output unit (6; 80) coupled to the motor. The output unit comprises a decelerating mechanism (42, 43, 56; 56, 92) for decelerating the rotation of the rotating shaft. A clutch (21; 71; 81; 200; 300) is located between the rotating shaft and the decelerating mechanism. The clutch allows transmission of rotation from the rotating shaft to the decelerating mechanism, and blocks transmission of rotation from the decelerating mechanism to the rotating shaft. The clutch located between the rotating shaft and the decelerating mechanism is not applied with a large load. For this reason, the strength required for the clutch can be reduced to provide the clutch in a smaller size.

49 Claims, 30 Drawing Sheets

Fig.19
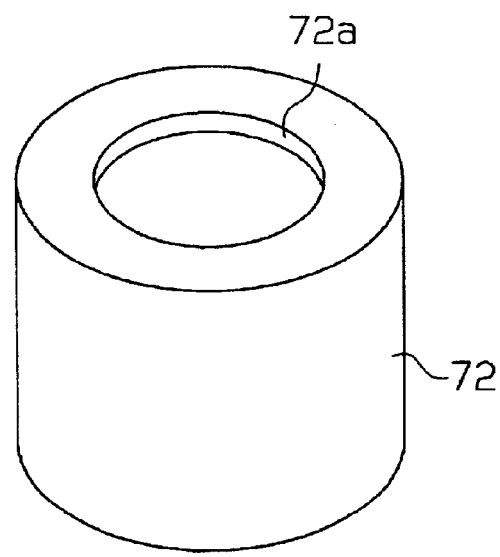
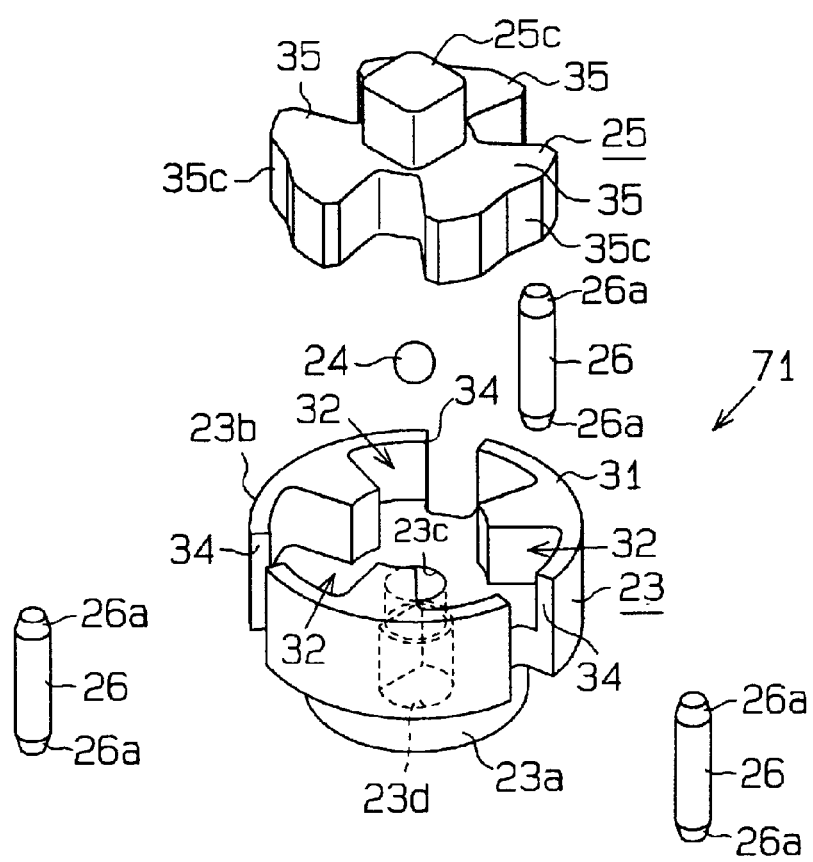

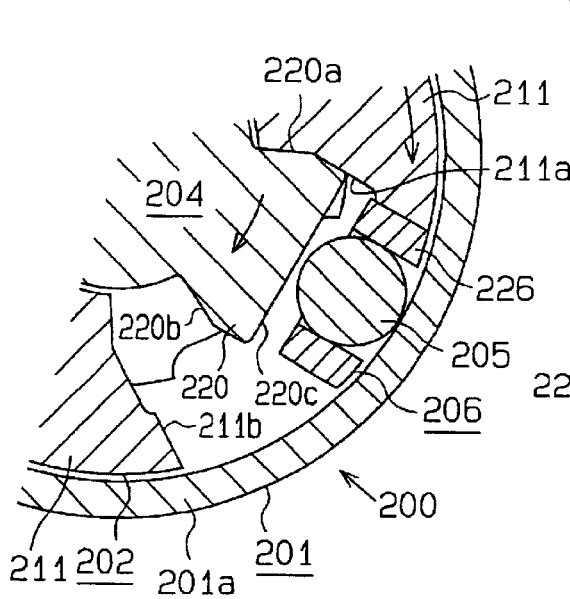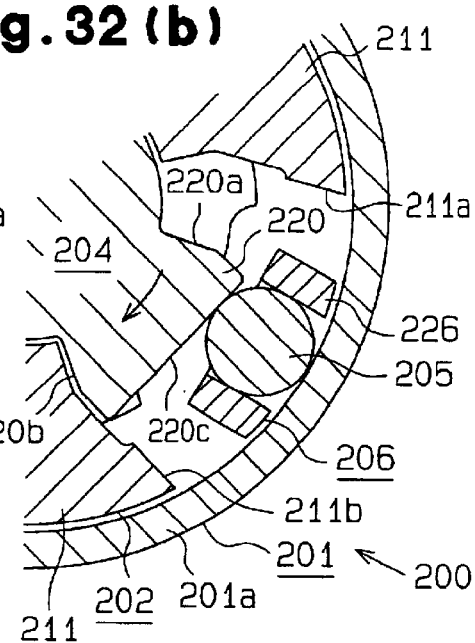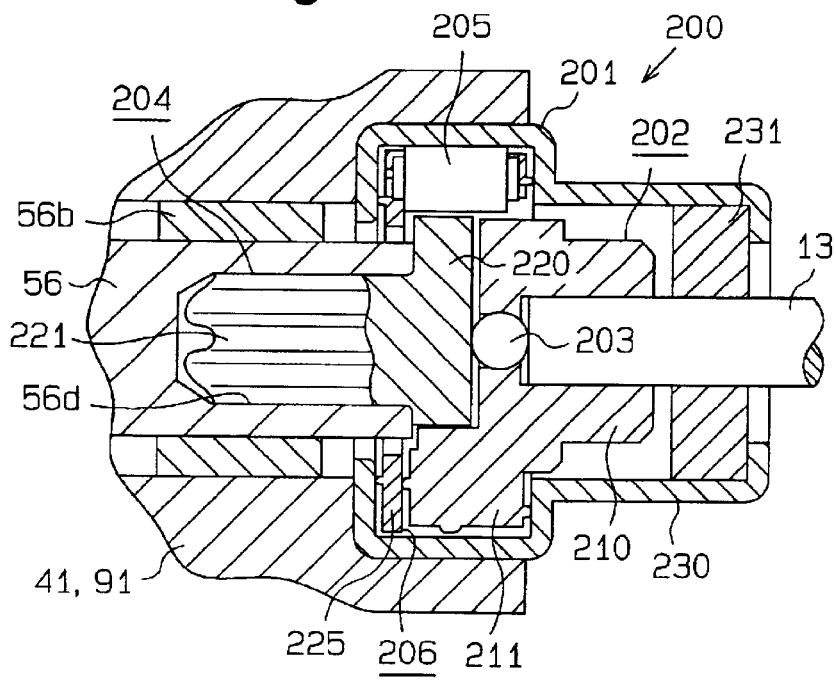

US 6,789,443 B1

DRIVING APPARATUS EQUIPPED WITH MOTOR AND DECELERATING MECHANISM

BACKGROUND OF THE INVENTION

The present invention relates to a driving apparatus for transmitting the rotation of a motor, after decelerated by a decelerating mechanism, to a driven device, and more particularly, to a driving apparatus that is equipped with a clutch for preventing the transmission of rotation from a decelerating mechanism to a motor.

A general power window apparatus comprises a driving apparatus equipped with a motor, and a driven device driven by the driving apparatus which moves a windowpane up and down, specifically, a lifting mechanism. The driving apparatus includes an output unit equipped with a worm gear mechanism which functions as a decelerating mechanism. The worm gear mechanism comprises a worm shaft coupled to a rotating shaft of the motor, and a worm wheel meshed with the worm shaft. The rotation of the motor is decelerated by the worm gear mechanism before it is transmitted to the lifting mechanism. In other words, a torque of the motor is amplified by the worm gear mechanism before it is transmitted to the lifting mechanism. The lifting mechanism converts the rotation of the motor to up/down movements of the windowpane.

When external force is applied to the windowpane while the motor is not driven, the external force is transmitted from the windowpane to the motor through the lifting mechanism and the output unit, causing the motor to rotate. Therefore, when external force is applied to the windowpane, the windowpane is allowed to move.

To prevent the movement of the windowpane caused by external force, the driving apparatus is equipped with a clutch. The clutch is located in the middle of a power transmission path between the motor and the lifting mechanism in the output unit. The clutch allows the power of the motor to be transmitted to the lifting mechanism through the output unit. However, when external force is applied to the windowpane, the clutch is locked to make a rotation impossible in order to prevent the external force from moving the lifting mechanism. In other words, the clutch blocks the transmission of rotation from the output unit to the motor.

Conventionally, the clutch is located between the worm wheel of the worm gear mechanism and the lifting mechanism in the output unit. However, in the decelerating mechanism, i.e. the worm gear mechanism functioning as a torque amplifying mechanism, the torque generated by the worm wheel is significantly larger than the torque generated by the worm shaft. Therefore, the clutch positioned between the worm wheel and the lifting mechanism is subjected to a large load. To stand such a large load, the clutch must be formed large in size and have a high strength. This will increase the manufacturing cost of the driving apparatus.

SUMMARY OF THE INVENTION

It is an object of the present invention to provide a driving apparatus equipped with a motor and a decelerating mechanism that is capable of reducing the load applied to a clutch.

To achieve the above object, the present invention provides a driving apparatus for driving a driven device. The driving apparatus comprises a motor including a rotating shaft and an output unit coupled to the motor. The output unit comprises a decelerating mechanism for transmitting rotation of the rotating shaft, after decelerating, to the driven device. A clutch is located between the rotating shaft and the decelerating mechanism. The clutch allows the rotation to be transmitted from the rotating shaft to the decelerating mechanism, and blocks the rotation transmitted from the decelerating mechanism to the rotating shaft.

The clutch located between the rotating shaft and the decelerating mechanism is not subjected to a large load. Therefore, the durability required for the clutch can be reduced with a result of a smaller-size clutch.

BRIEF DESCRIPTION OF THE DRAWINGS

FIG. 19 is an exploded perspective view illustrating a clutch located in the driving apparatus of FIG. 18;

FIGS. 32(a) and 32(b) are partial cross-sectional views for explaining the operation of the clutch;

FIG. 33 is a cross-sectional view illustrating a clutch according to a tenth embodiment of the present invention;

DETAILED DESCRIPTION OF THE PREFERRED EMBODIMENT

First Embodiment

In the following, a first embodiment which embodies a driving apparatus of the present invention in a power window apparatus will be described with reference to FIGS. 1 through 12.

Figure 12:
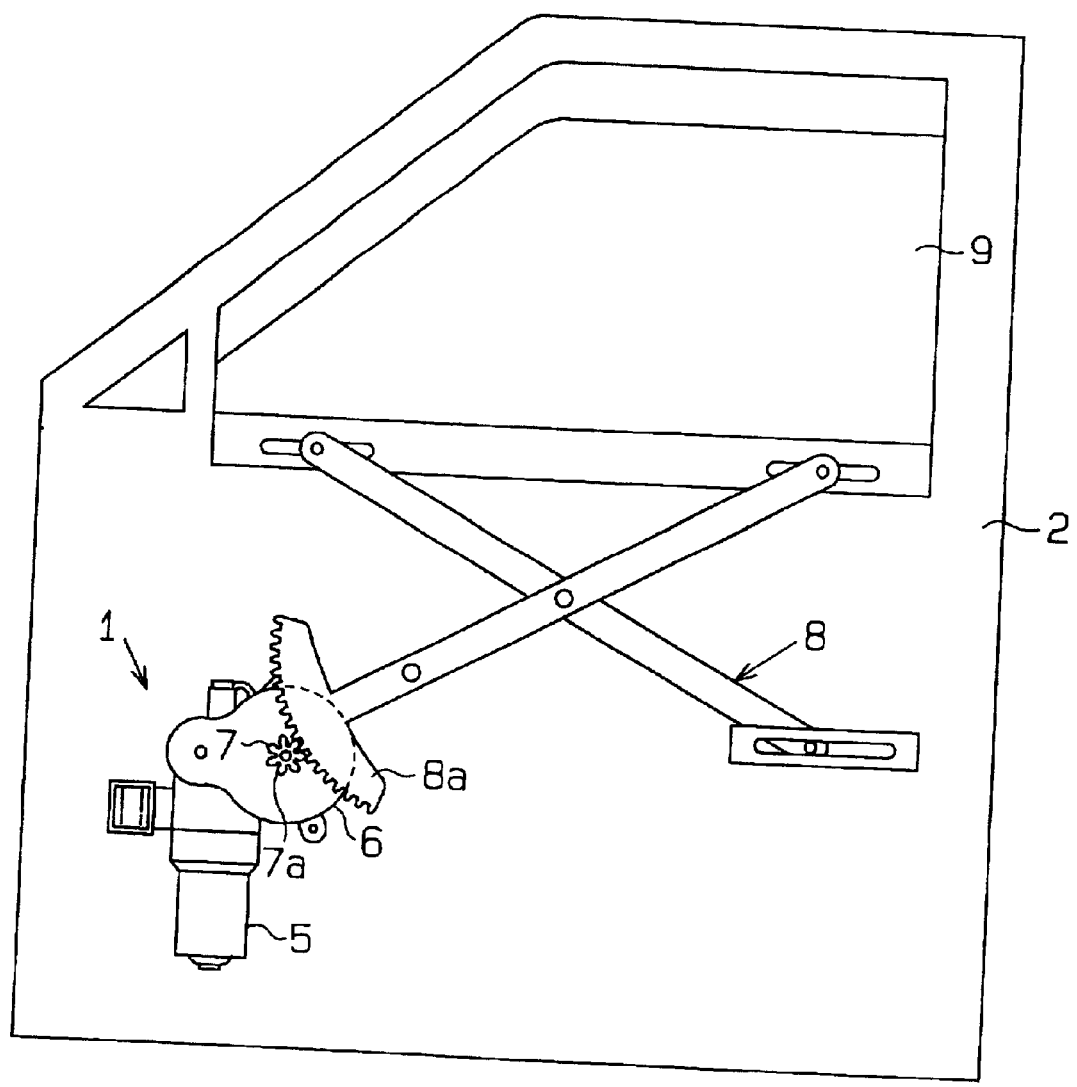
FIG. 12 is a general structural diagram of a power window apparatus equipped with the driving apparatus of FIG. 1.

As illustrated in FIG. 12, the power window apparatus is located within a door 2 of a vehicle for moving a windowpane 9 up and down. The power window apparatus comprises a driving apparatus 1 fixed to the inside of the door 2, and a lifting mechanism 8 driven by the driving apparatus 1 for moving the windowpane 9 up and down. The driving apparatus 1 includes a motor 5 and an output unit 6. The output unit 6 has an output shaft 7 formed with a gear 7a. The rotation of the motor 5, which is decelerated by the output unit 6, is transmitted to the output shaft 7. The lifting mechanism 8 includes two arms which intersect each other, wherein both arms are interlocked by a shaft in the middle. Upper ends of both arms are coupled to the windowpane 9. One of the arms has a fan-shaped gear 8a, at a lower end thereof, meshed with the gear 7a of the output shaft 7. As the motor 5 is driven to rotate the gear 7a, the lifting mechanism 8 moves the windowpane 9 up and down.

Figure 1:
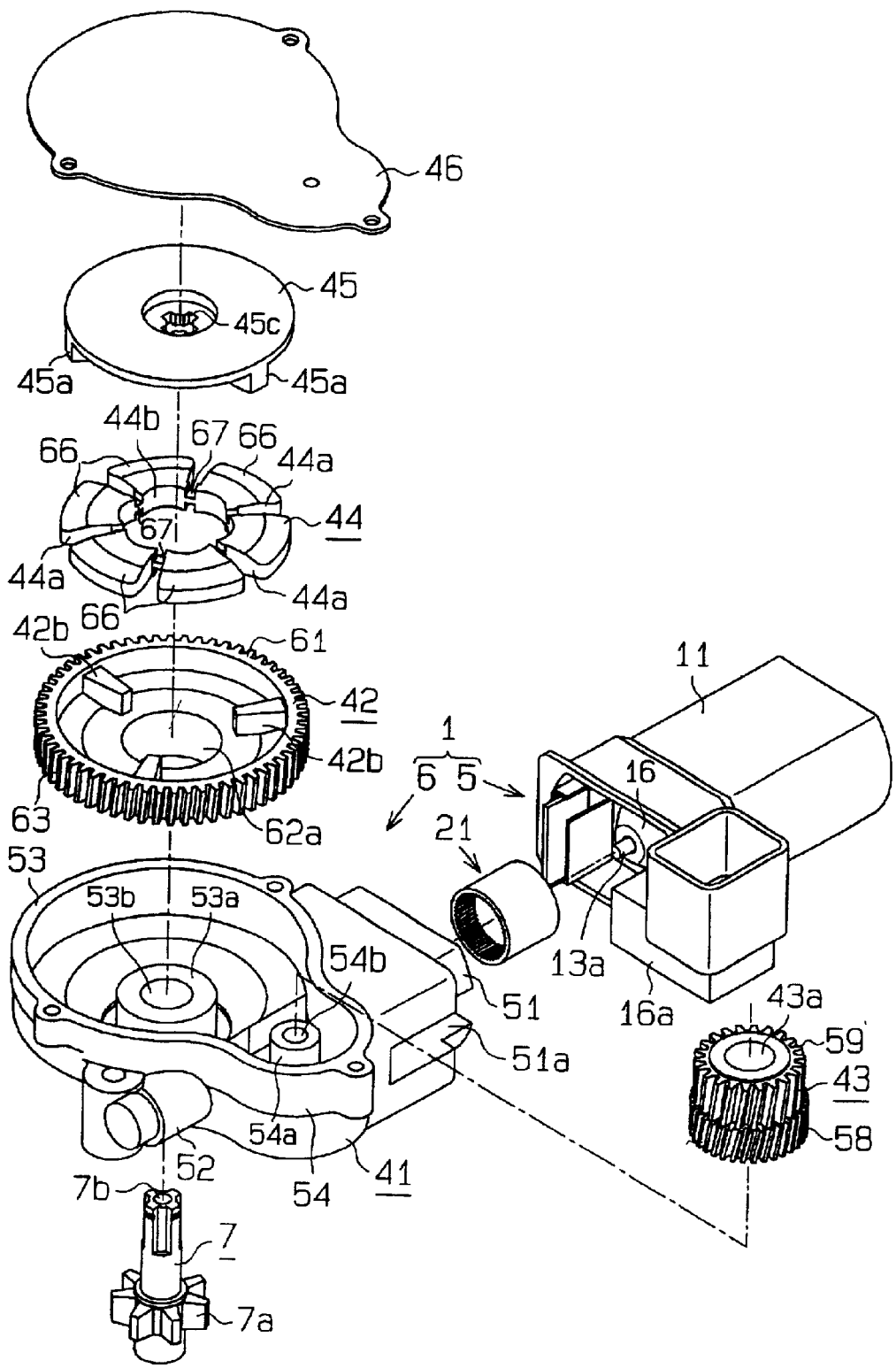
FIG. 1 is an exploded perspective view illustrating a driving apparatus according to a first embodiment of the present invention.
Figure 2:
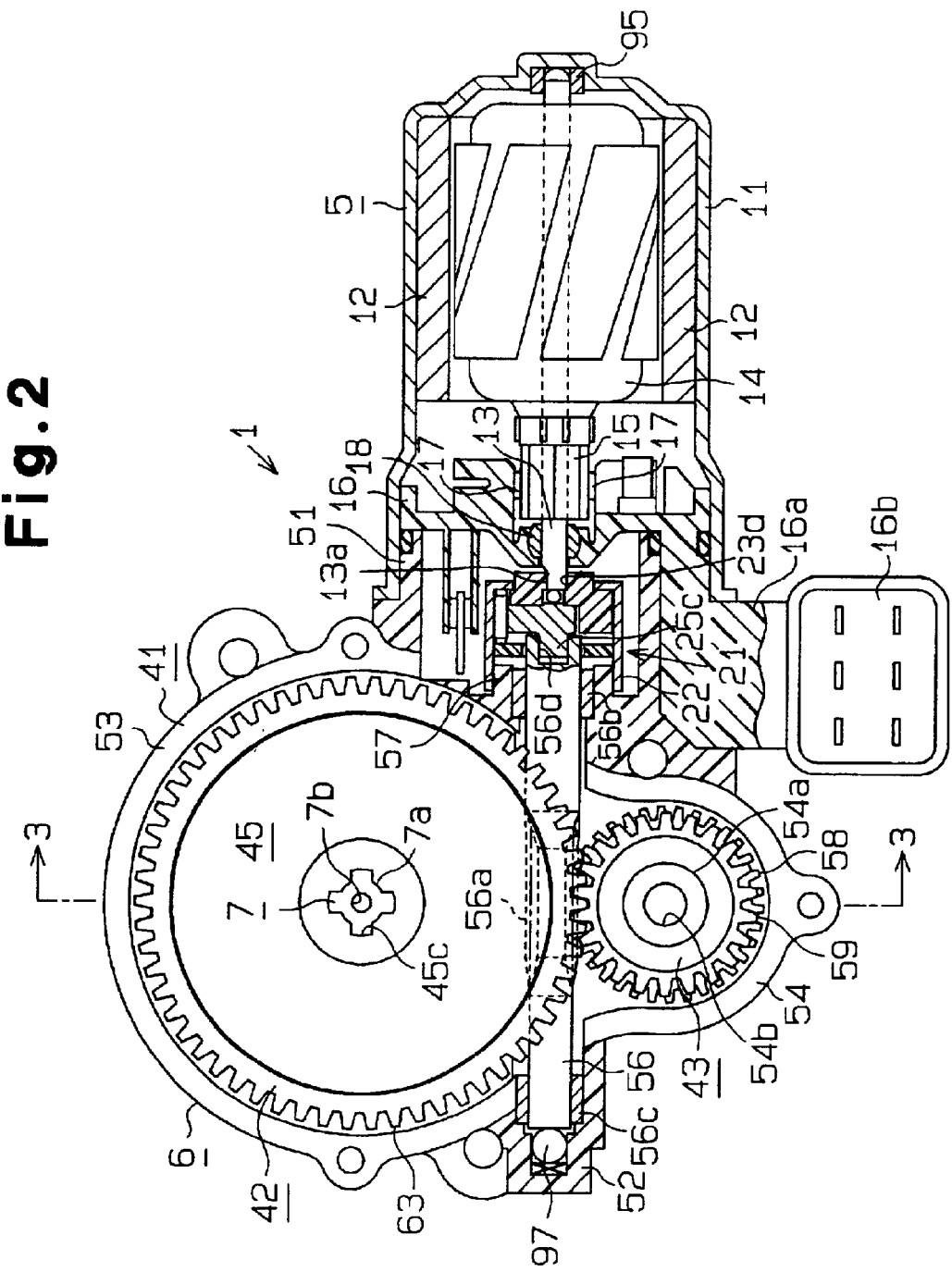
FIG. 2 is a plan cross-sectional view of the driving apparatus of FIG. 1.

FIGS. 1 and 2 both illustrate the driving apparatus 1. As illustrated in these figures, the driving apparatus 1 comprises the motor 5 and the output unit 6 coupled through a clutch 21. Describing first the motor 5, the motor 5 comprises a motor housing 11 formed in a closed cylinder. A brash holder 16 made of a resin material is fitted into the opening of the motor housing 11. The brash holder 16 forms part of the motor housing 11. Two magnets 12 are secured on the inner face of the motor housing 11 such that they oppose each other. A rotating shaft 13 is rotatably supported between the inner bottom of the motor housing 11 and the brush holder 16. A proximal end of the rotating shaft 13 is supported to the motor housing 11 by a bearing 95. A bearing 18 is located between the brush holder 16 and the rotating shaft 13. A distal end of the rotating shaft 13 is formed with a fitting portion 13a having a generally D-shaped cross section by cutting away a portion of the peripheral face of the rotating shaft 13 to be flat.

An armature 14 with a coil wound around it is fixed on the rotating shaft 13 such that it is surrounded by the magnets 12. A commutator 15 is fixed on the rotating shaft 13 between the armature 14 and the bearing 18, and is surrounded by the brush holder 16. A brush 17 is attached to a portion of the brush holder 16, which surrounds the commutator 15, such that the brush 17 is in contact with the commutator 15. The brush holder 16 also has an extension 16a extending outwardly to the motor housing 11. The extension 16a is provided with a power supply unit 16b.

As a current from an external power source (not shown) is supplied to the armature 14 through the power supply unit 16b, the brush 17 and the commutator 15, the rotating shaft 13 is rotated together with the commutator 15 and the armature 14.

Figure 4:
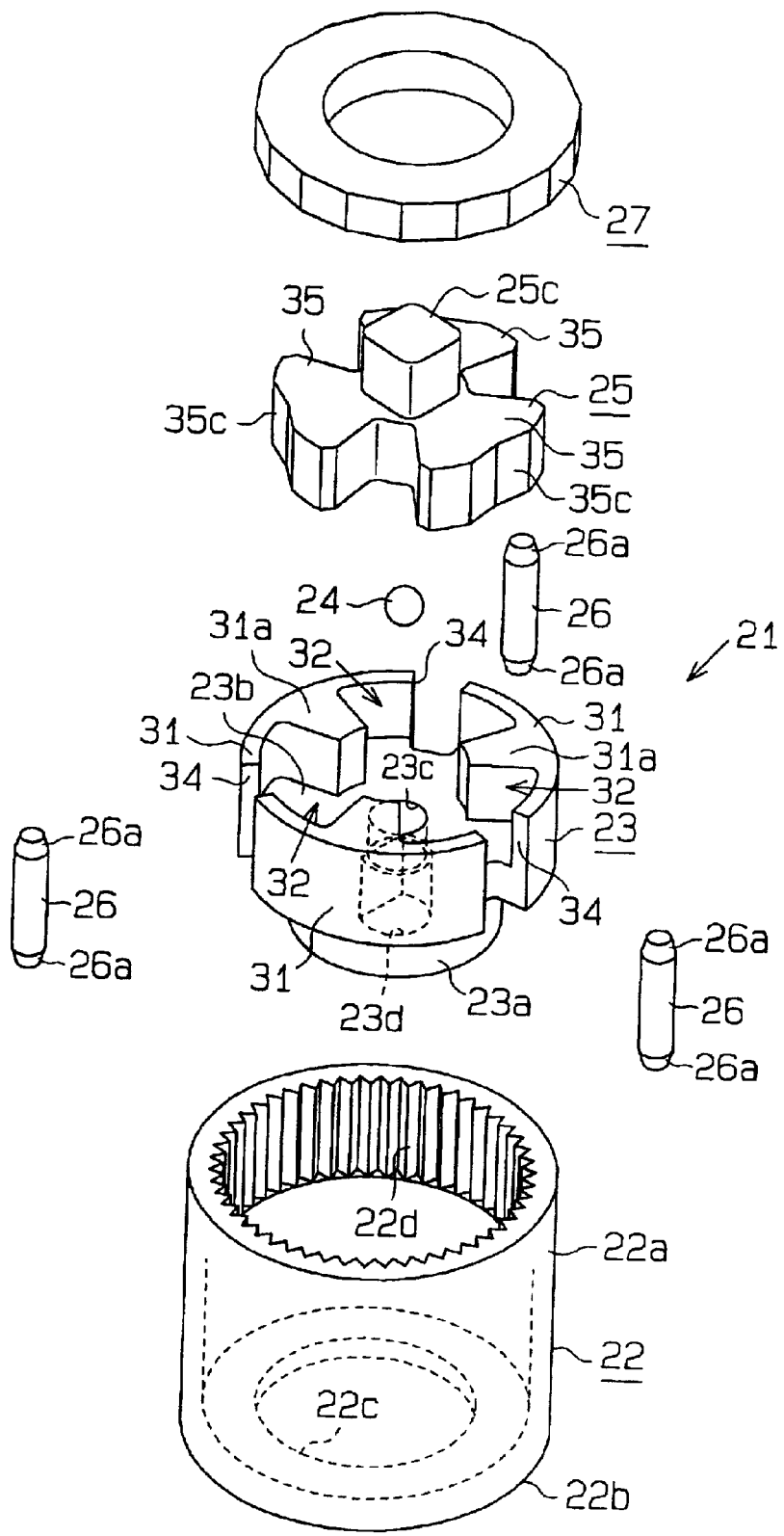
FIG. 4 is an exploded perspective view of a clutch located in the driving apparatus of FIG. 1.
Figure 5:
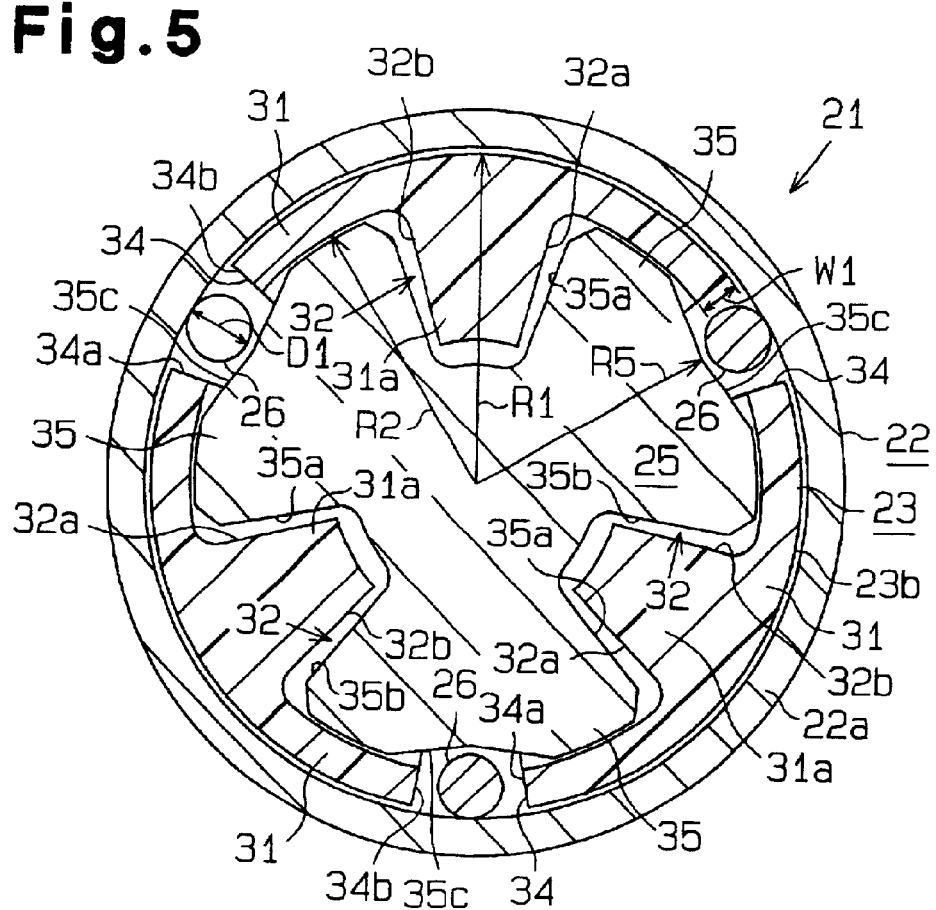
FIG. 5 is a plane cross-sectional view of the clutch of FIG. 4.
Figure 6:
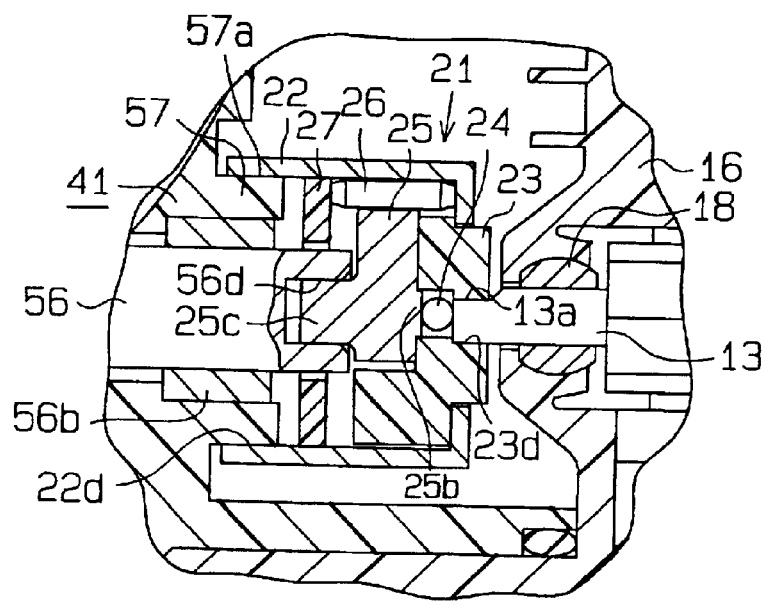
FIG. 6 is a partial cross-sectional view illustrating in an enlarged view a portion of the clutch in the driving apparatus of FIG. 2.

Next, the clutch 21 will be described. As illustrated in FIGS. 1 and 2, the clutch 21 is coupled to the distal end of the rotating shaft 13 of the motor 5. As illustrated in FIGS. 4 through 6, the clutch 21 comprises a clutch housing 22, a driving rotor 23, a ball 24, a driven rotor 25, a plurality (three in this embodiment) of cylindrical rollers 26, and a support ring 27.

The driving rotor 23, which is formed of a resin material, has a smaller diameter portion 23a and a larger diameter portion 23b. The driving rotor 23 has a shaft hole 23c which extends through the driving rotor 23. A portion of the shaft hole 23c forms a fitting hole 23d having a shape corresponding to the fitting portion 13a of the rotating shaft 13. As illustrated in FIG. 6, the fitting portion 13a of the rotating shaft 13 is fitted into the fitting hole 23d such that the driving rotor 23 is rotated integrally with the rotating shaft 13.

As illustrated in FIGS. 4 and 5, the larger diameter portion 23b has a plurality (three in this embodiment) of arcuate walls 31 arranged at regular angular intervals. When the diameter of the outer peripheral face of the arcuate walls 31 is R1 and the diameter of the inner peripheral face of the arcuate walls 31 is R2, the thickness W of the arcuate walls 31 in the radial direction is represented by R1–R2. Each of the arcuate walls 31 has a first side face 34a and a second side face 34b on both circumferential ends. The larger diameter portion 23b has a notch 34 between two adjacent arcuate walls 31. Specifically, each notch 34 is formed between the first side face 34a and the second side face 34b opposite to the first side face 34a. The width of each notch 34 in the circumferential direction, i.e. the width between the opposing first side face 34a and second side face 34b in the circumferential direction is larger than the thickness W1 of the arcuate walls 31 in the radial direction.

A driving engagement body 31a extends from the inner peripheral face of each arcuate wall 31 to the center of the larger diameter portion 23b. The driving engagement bodies 31a are located at intermediate locations of the respective arcuate walls 31 in the circumferential direction, and mutually arranged at equal angular intervals. An accommodation chamber 32 generally in a fan shape is formed between two adjacent driving engagement bodies 31a. These accommodation chambers 32 communicate with one another near the center of the larger diameter portion 23b to form a single accommodation space for accommodating the driven rotor 25, later described. Each driving engagement body 31a has a first side face 32a and a second side face 32b on both circumferential sides. Each accommodation chamber 32 is formed between the first side face 32a and the second side face 32b opposing the first side face 32a.

As illustrated in FIGS. 4 and 6, the ball 24 is made of metal, and is accommodated in the shaft hole 23c of the driving rotor 23.

As illustrated in FIGS. 4 through 6, the driven rotor 25, which is made of a metal material, is located within the accommodation space formed by the larger diameter portion 23b of the driving rotor 23 for rotation relative to the driving rotor 23. The driven rotor 25 has a plurality (three in this embodiment) of driven engagement bodies 35 arranged at equal angular intervals and formed generally in a fan shape. The radius of the driven engagement bodies 35 is identical to or slightly smaller than the radius R2 of the inner peripheral face of the arcuate walls 31. Each driven engagement body 35 is accommodated in the accommodation chamber 32 of the driving rotor 23. The width of the driven engagement bodies 35 in the circumferential direction is smaller than the width of the accommodation chamber 32 in the circumferential direction, and larger than the width of the notch 34 in the circumferential direction.

The driven rotor 25 has a short shaft portion 25b (see FIG. 6) which fits into the shaft hole 23c of the driving rotor 23. The driven rotor 25 is rotatable relative to the driving rotor 23 about the shaft portion 25b. The ball 24 located in the shaft hole 23c is positioned between an end face of the shaft portion 25b and an end face of the rotating shaft 13 of the motor 5. The ball 24 prevents the driven rotor 25 from being strongly pressed by the driving rotor 23 to smoothly provide the relative rotation between the driving rotor 23 and the driven rotor 25. The driven rotor 25 also has a fitting shaft 25c which is located coaxial with the shaft portion 25b and extends in the direction opposite to the shaft portion 25b. The fitting shaft 25c has a generally rectangular cross section, as illustrated in FIG. 4.

Figures 7A, 7B:
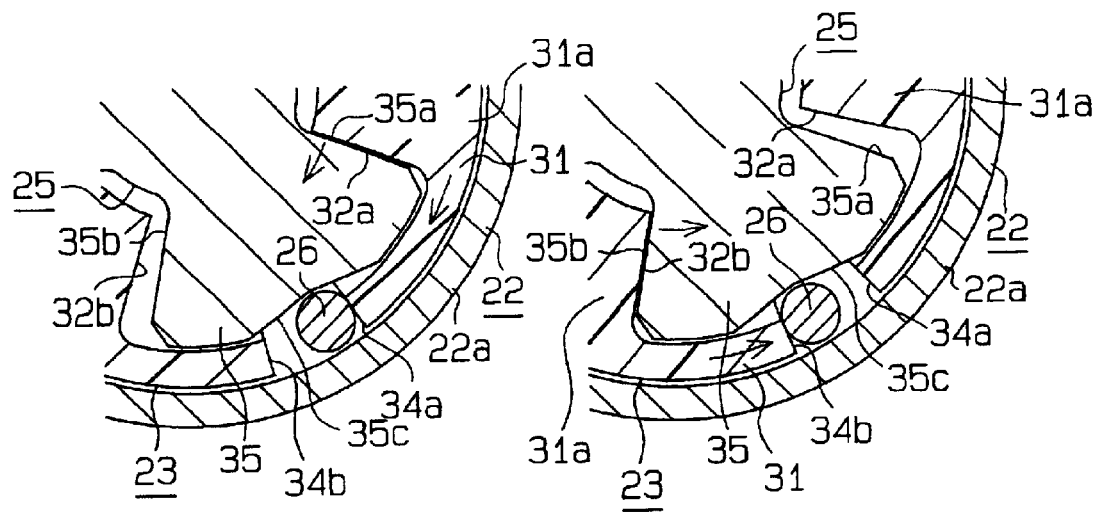
FIGS. 7(a) and 7(b) are partial cross-sectional views for explaining the operation of the clutch.

Each driven engagement body 35 has a first side face 35a opposite to the first side face 32a of the driving engagement body 31a, and a second side face 35b opposite to the second side face 32b of the driving engagement body 31a. As illustrated in FIG. 7(a), as the driving rotor 23 rotates in the clockwise direction, the first side face 32a of the driving engagement body 31a comes into contact with the first side face 35a of the driven engagement body 35. In this state, the driven rotor 25 integrally rotates in the clockwise direction together with the driving rotor 23. Conversely, as illustrated in FIG. 7(b), as the driving rotor 23 rotates in the counter clockwise direction, the second side face 32b of the driving engagement body 31a comes in contact with the second side face 35b of the driven engagement body 35. In this state, the driven rotor 25 integrally rotates in the counter clockwise direction together with the driving rotor 23.

As illustrated in FIGS. 4 and 5, each driven engagement body 35 has a shallow V-shaped groove on its outer peripheral face at an intermediate location in the circumferential direction. The V-shaped groove is defined by a V-shaped restriction face 35c formed on the outer peripheral face of the driven engagement body 35. The distance R5 from the center of the driven rotor 25 to the intermediate location of the restriction face 35c in the circumferential direction, i.e., to the bottom center of the V-shaped groove is smaller than the radius of a portion of the driven engagement body 35 except for the restriction face 35c.

The driving rotor 23 and the driven rotor 25 are accommodated in the clutch housing 22. A slight gap is formed between the outer peripheral face of the driving rotor 23 and the inner peripheral face of the clutch housing 22. The clutch housing 22, which is formed of a metal material, comprises a cylindrical body 22a and a bottom plate 22b. A shaft hole 22c is formed at the center of the bottom plate 22b. The smaller diameter portion 23a of the driving rotor 23 is inserted through the shaft hole 22c. Multiple splines 22d extending in the axial direction of the cylindrical body 22a are formed on the inner peripheral face near an opening of the cylindrical body 22a.

As illustrated in FIG. 5, the roller 26, as a rolling body, is located between the restriction face 35c and the inner peripheral face of the clutch housing 22 in the notch 34 of the driving rotor 23. The roller 26 extends in parallel with the axial line of the driving rotor 23. The diameter D1 of the roller 26 is larger than the thickness W1 of the arcuate wall 31. As illustrated in FIG. 4, the roller 26 has tapered faces 26a in both end portions.

As illustrated in FIG. 7(a), as the driving rotor 23 rotates in the clockwise direction, the first side face 32a of the driving engagement body 31a comes in contact with the first side face 35a of the driven engagement body 35, and the first side face 34a of the arcuate wall 31 comes in contact with the roller 26. In this event, the axial center of the roller 26 is positioned on a radial line which passes the axial center of the driven rotor 25 and an intermediate location of the restriction face 35c in the circumferential direction. Conversely, as illustrated in FIG. 7(b), as the driving rotor 23 rotates in the counter clockwise direction, the second side face 32b of the driving engagement body 31a comes in contact with the second side face 35b of the driven engagement body 35, and the second side face 34b of the arcuate wall 31 comes in contact with the roller 26. In this event, the axial center of the roller 26 is also positioned on the radial line which passes the axial center of the driven rotor 25 and the intermediate location of the restriction face 35c in the circumferential direction.

As illustrated in FIGS. 5, 7(a) and 7(b), when the roller 26 is placed at a position corresponding to the intermediate location of the restriction face 35c in the circumferential direction, the roller 26 is placed between the restriction face 35c and the inner peripheral face of the clutch housing 22 with a clearance. Stated another way, the roller 26 is not held between the restriction face 35c and the inner peripheral face of the clutch housing 22. In the following, such a state is referred to as the "free state" of the roller 26. When the roller 26 is in the free state, the driven rotor 25 is allowed to rotate relative to the clutch housing 22.

Thus, as illustrated in FIGS. 7(a) and 7(b), when the driving rotor 23 rotates in the clockwise direction or in the counter clockwise direction, the roller 26 is brought into the free state, so that the driven rotor 25 can rotate relative to the clutch housing 22 together with the driving rotor 23. The roller 26 circulates about the axial center of the driving rotor 23 as it is pressed by the arcuate wall 31, and maintained in the free state.

Figures 8A, 8B:
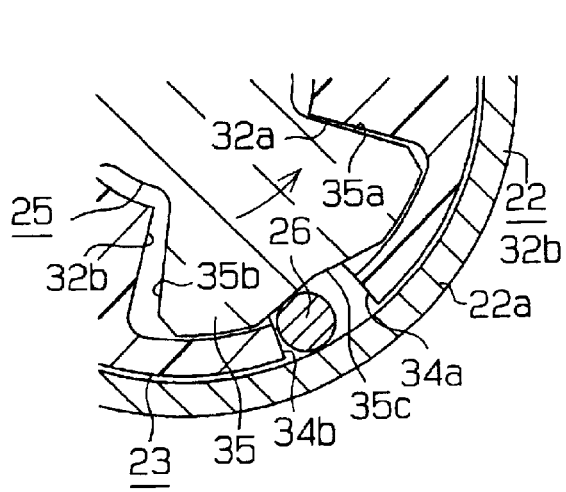
FIGS. 8(a) and 8(b) are partial cross-sectional views for explaining the operation of the clutch.

On the other hand, as illustrated in FIG. 8(a), as the driven rotor 25 itself rotates in the counter clockwise direction, the restriction face 35c of the driven engagement body 35 moves relative to the roller 26 such that the roller 26 is held between the restriction face 35c and the inner peripheral face of the clutch housing 22. As illustrated in FIG. 8(b), when the driven rotor 25 itself rotates in the clockwise direction, the restriction face 35c of the driven engagement body 35 moves relative to the roller 26 as well, at such that the roller 26 is held between the restriction face 35c and the inner peripheral face of the clutch housing 22. In the following, the state in which the roller 26 is held between the restriction face 35c and the inner peripheral face of the clutch housing 22 is referred to as the "lock state" of the roller 26. When the roller 26 is in the lock state, the driven rotor 25 is prevented from rotating relative to the clutch housing 22. The roller 26 functions as a lock member.

Figure 9A:
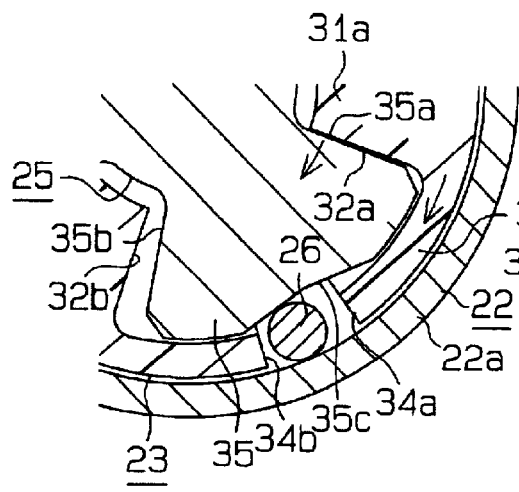
FIGS. 9(a) and 9(b) are partial cross-sectional views for explaining the operation of the clutch.

As the driving rotor 23 rotates from the lock state of the roller 26 illustrated in FIG. 8(a) in the clockwise direction as illustrated in FIG. 9(a), the first side face 32a of the driving engagement body 31a first comes into contact with the first side face 35a of the driven engagement body 35, causing the driven rotor 25 to rotate in the clockwise direction. In association, the roller 26 is released from the lock state. Subsequently, the first side face 34a of the arcuate wall 31 comes in contact with the roller 26 so that the roller 26 is maintained in the free state, as explained in connection with FIG. 7(a).

Figure 10A:
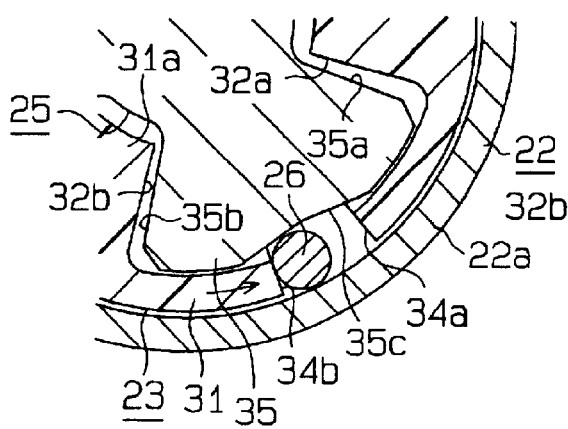
FIGS. 10(a) and 10(b) are partial cross-sectional views for explaining the operation of the clutch.

Likewise, as the driving rotor 23 rotates from the lock state of the roller 26 illustrated in FIG. 8(a) in the counter clockwise direction as illustrated in FIG. 10(a), the second side face 34b of the arcuate wall 31 presses the roller 26 to release the roller 26 from the lock state. Subsequently, the second side face 32b of the driving engagement body 31a comes in contact with the second side face 35b of the driven engagement body 35, causing the driven rotor 25 to rotate in the counter clockwise direction. Simultaneously, as explained with reference to FIG. 7(b), the roller 26 is maintained in the free state.

Figure 9B:
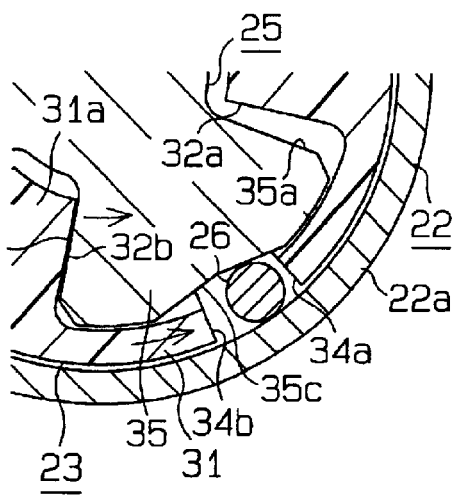

On the other hand, as the driving rotor 23 rotates from the lock state of the roller 26 illustrated in FIG. 8(b) in the counter clockwise direction as illustrated in FIG. 9(b), the second side face 32b of the driving engagement body 31a first comes in contact with the second side face 35b of the driven engagement body 35, causing the driven rotor 25 to rotate in the counter clockwise direction. In association, the roller 26 is released from the lock state. Subsequently, the second side face 34b of the arcuate wall 31 comes in contact with the roller 26 to maintain the roller 26 in the free state, as explained with reference to FIG. 7(b).

Figure 10B:
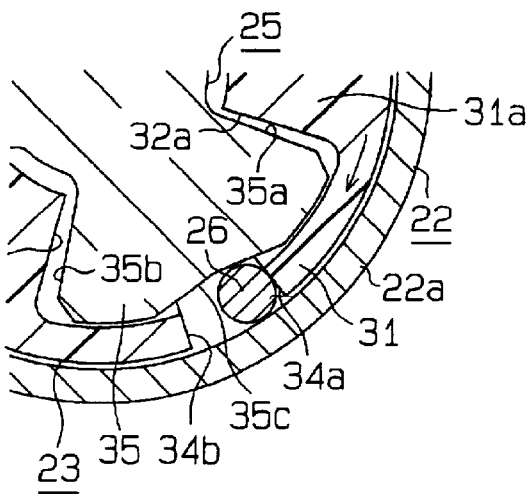

Likewise, as the driving rotor 23 rotates from the lock state of the roller 26 illustrated in FIG. 8(b) in the clockwise direction as illustrated in FIG. 10(b), the first side face 34a of the arcuate wall 31 first presses the roller 26 to release the roller 26 from the lock state. Next, the first side face 32a of the driving engagement body 31a comes in contact with the first side face 35a of the driven roller 35, causing the driven roller 25 to rotate in the clockwise direction. Simultaneously, as explained with reference to FIG. 7(a), the roller 26 is maintained in the free state.

In the above-mentioned transition of the roller 26 from the lock state to the free state, the timing at which the arcuate wall 31 collides with the roller 26 is different from the timing at which the driving engagement body 31a collides with the driven engagement body 35. This reduces noise which occurs associated with the collision, as compared with the case where the timing at which the arcuate wall 31 collides with the roller 26 is coincident with the timing at which the driving engagement body 31a collides with the driven engagement body 35.

As illustrated in FIGS. 4 and 6, the support ring 27, which is made of a resin material, has its outer periphery in a polygonal shape, more specifically, in a regular octadecagon. The support ring 27 is press fitted into the clutch housing 22 from the opening of the clutch housing 22 and fixed therein. With the support ring 27, the driving rotor 23, the driven rotor 25, the ball 24 and the roller 26 are held in the clutch housing 22. Particularly, the roller 26 is restricted in axial movements by the bottom plate 22b of the clutch housing 22 and the support ring 27. Since the support ring 27 is made of a resin material, sliding noise generated between the roller 26 and the support ring 27 is suppressed during the rotation of the motor 5.

Next, the output unit 6 will be described. As illustrated in FIGS. 1 and 2, the output unit 6 comprises a unit housing 41, a worm shaft 56, a worm wheel 43, a helical gear 42, a buffer member 44, an end plate 45, a cover 46, and an output shaft 7. The worm shaft 56, the worm wheel 43 and the helical gear 42 comprise a worm gear mechanism which functions as a decelerating mechanism and a torque amplifying mechanism.

Figure 11:
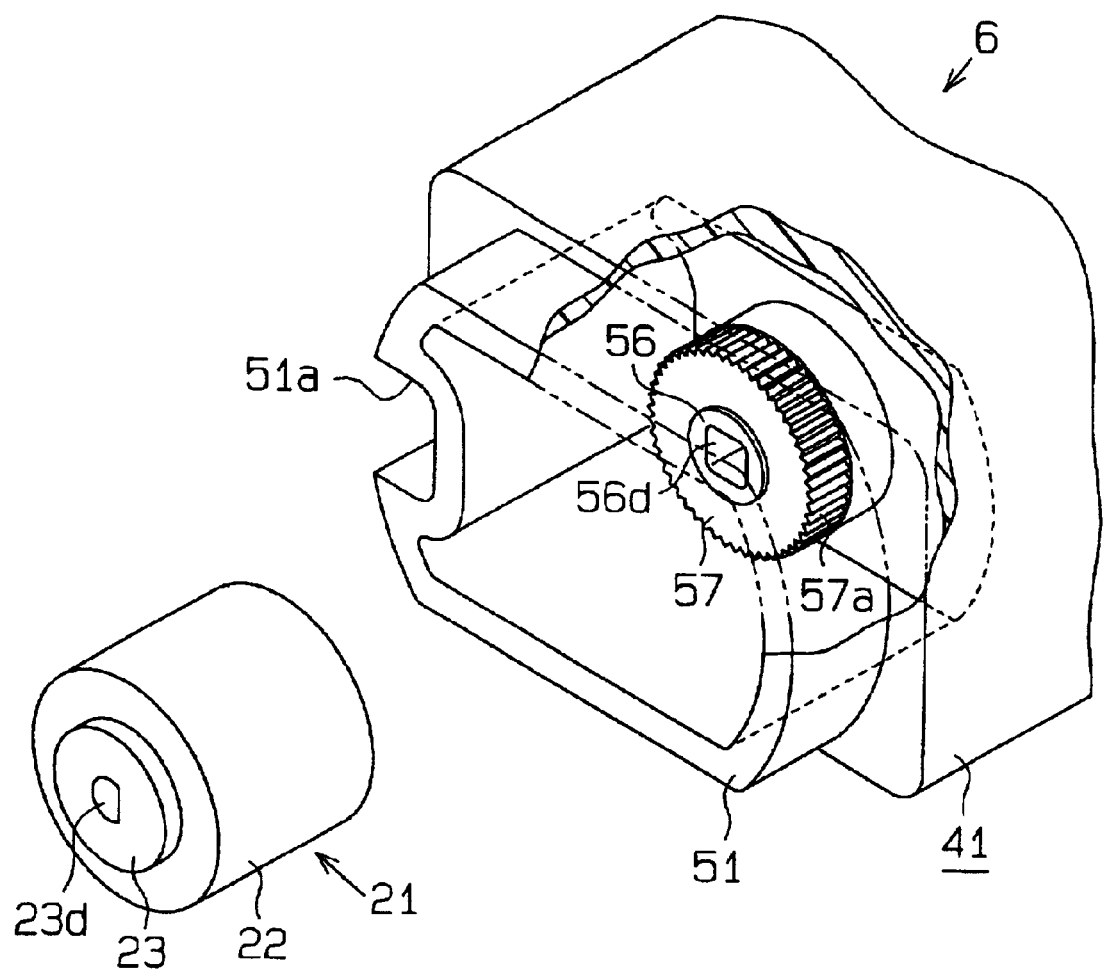
FIG. 11 is an exploded perspective view illustrating a mechanism for coupling an output unit with the clutch in the driving apparatus of FIG. 1.

As illustrated in FIGS. 1, 2 and 11, the unit housing 41 has a fitting cylinder 51 in a flat cylindrical shape which fits into the open end of the motor housing 11. The fitting cylinder 51 is inserted into the open end of the motor housing 11 to fix the output unit 6 to the motor 5. The fitting cylinder 51 has a groove 51a on its outer peripheral face for engagement with the extension 16a of the motor 5. When the output unit 6 is fixed to the motor 5, the clutch 21 is located inside the fitting cylinder 51.

As illustrated in FIGS. 1 and 2, the worm shaft 56 having spiral teeth 56a is rotatably supported by the unit housing 41 so as to be positioned substantially coaxially with the rotating shaft 13 of the motor 5 attached to the output unit 6. The unit housing 41 comprises a closed supporting cylinder 52 for supporting a distal end (the left-hand end in FIG. 2) of the worm shaft 56, and a mounting cylinder 57 for supporting a proximal end of the worm shaft 56. The supporting cylinder 52 and the mounting cylinder 57 are located on the same axial line. The supporting cylinder 52 and the mounting cylinder 57 support the worm shaft 56 through slide bearings 56c, 56b, respectively. A thrust bearing 97 located in the supporting cylinder 52 receives force acting on the worm shaft 56 in the axial direction. As illustrated in FIG. 11, the mounting cylinder 57 is located within the fitting cylinder 51.

As illustrated in FIGS. 6 and 11, a proximal end face of the worm shaft 56 is formed with a fitting hole 56d having a generally rectangular cross section. The fitting shaft 25c of the driven rotor 25 of the clutch 21 is fitted into the fitting hole 56d. Thus, the worm shaft 56 rotates integrally with the driven rotor 25. The cross-sectional shapes of fitting shaft 25c and the fitting hole 56d are not limited to be rectangular, but any shape such as a D-shape and so on may be employed as long as no relative rotation is produced between the worm shaft 56 and the driven rotor 25.

The mounting cylinder 57 as a support for supporting the proximal end of the worm shaft 56 functions for mounting the clutch housing 22. Specifically, as illustrated in FIG. 11, the mounting cylinder 57 has an outer diameter corresponding to the inner diameter of the clutch housing 22. On the outer peripheral face of the mounting cylinder 57, multiple splines 57a are formed for engagement with the splines 22d (see FIG. 4) of the clutch housing 22. Both splines 22d, 57a are engaged with each other to mount the clutch housing 22 to the mounting cylinder 57 in a manner disabling the rotation. Both the splines 22d, 57a comprise engaging means.

Figure 3:
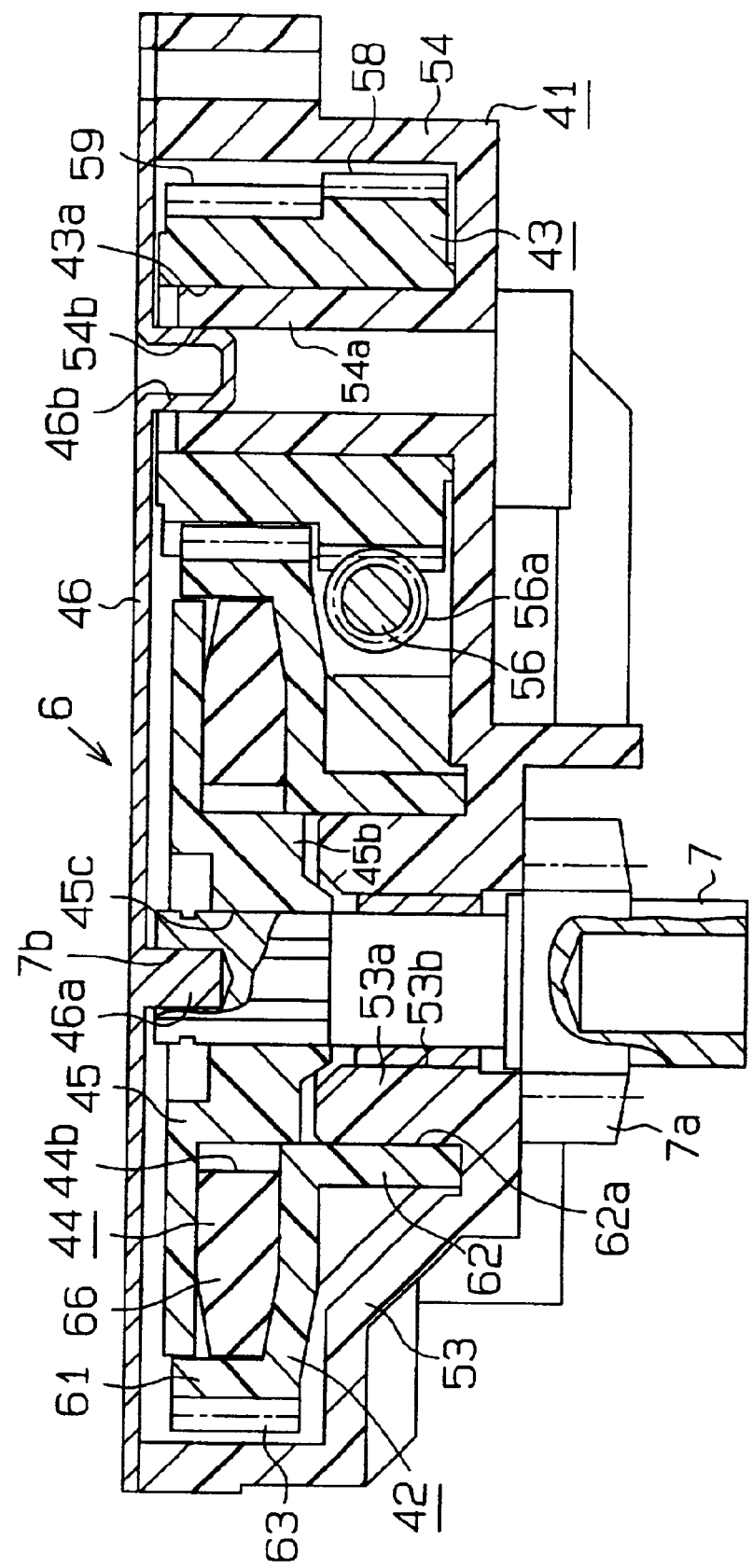
FIG. 3 is a cross-sectional view taken along the line 3—3 in FIG. 2.

As illustrated in FIGS. 1 through 3, the unit housing 41 comprises a first accommodating portion 54 for accommodating the worm wheel 43, and a second accommodating portion 53 for accommodating the helical gear 42. The accommodating portions 54, 53 are each formed generally in a closed cylinder, and are positioned on opposite sides to each other with respect to the worm shaft 56 interposed therebetween. Both the accommodating portions 54, 53 have inner spaces in communication with each other. The helical gear 42 has a diameter larger than that of the worm wheel 43, and the second accommodating portion 53 has a diameter larger than that of the first accommodating portion 54 in accordance with the difference in diameter.

The supporting cylinder 54a is implanted on the inner bottom of the first accommodating portion 54. The supporting cylinder 54a has an attachment hole 54b for attaching the cover 46 thereto. The worm wheel 43 is made of a resin material, and is divided into a first gear 58 and a second gear 59 at an intermediate location in the axial direction. Both gears 58, 59 are helical gears formed integrally with each other. The first gear 58 is slightly larger in diameter than the second gear 59. The worm wheel 43 has a shaft hole 43a. The supporting cylinder 54a is fitted into the shaft hole 43a to rotatably support the worm wheel 43 by the supporting cylinder 54a in the first accommodating portion 54. In this event, the first gear 58 is meshed with the spiral teeth 56a of the worm shaft 56.

The supporting cylinder 53a is implanted on the inner bottom of the second accommodating portion 53. The supporting cylinder 53a has a shaft hole 53b for rotatably supporting the output shaft 7. The helical gear 42 is made of a resin material, and includes a gear wheel 61 comprised of a cylindrical body and an annular bottom plate, and a cylindrical body 62 extending from the bottom plate of the gear wheel 61. The supporting cylinder 53a is fitted into the shaft hole 62a of the cylindrical body 62 to rotatably support the helical gear 42 by the supporting cylinder 53a in the second accommodating portion 53. In this event, teeth 63 formed around the outer periphery of the gear wheel 61 are meshed with the second gear 59 of the worm wheel 43. On the inner side of the gear wheel 61, three radially extending stopper protrusions 42b are formed at equal angular intervals (120°).

The buffer member 44, which is made of rubber, is located in the gear wheel 61. The buffer member 44 includes six fan-shaped rubber segments 66 arranged at equal angular intervals (60°), and elongated coupling rubbers 67 for coupling adjacent rubber segments 66 to each other, and is generally has an annular shape. A slit 44a extending in a radial direction is formed between two adjacent rubber segments 66. The buffer member 44 is formed with a shaft hole 44b at the center thereof. The three slits 44a arranged at angular intervals of 120° are engaged with the three stopper protrusions 42b to mount the buffer member 44 in the helical gear 42 for rotation integral therewith.

The end plate 45, which is made of a generally disc-shaped resin material, is mounted on the helical gear 42 such that the buffer member 44 is held therebetween. On a lower face of the end plate 45 three radially extending stopper protrusions 45a are formed at equal angular intervals (120°). When the end plate 45 is mounted on the helical gear 42, these stopper protrusions 45a are engaged with the remaining slits 44a which are not engaged with the stopper protrusions 42b of the helical gear 42. Thus, the rotation of the helical gear 42 is transmitted to the end plate 45 through the buffer member 44, so that the end plate 45 rotates integrally with the helical gear 42.

The coupling cylinder 45b extends downward from the center of the end plate 45. The coupling cylinder 45b is inserted into the shaft hole 44b of the buffer member 44, with its distal end fitted into the shaft hole 62a of the helical gear 42. The coupling cylinder 45b has a fitting hole 45c of a cross shape in cross section.

The output shaft 7 is inserted into the supporting cylinder 53a of the second accommodating portion 53 from the bottom of the unit housing 41, with its upper end protruding upward from the supporting cylinder 53a. The upper end of the output shaft 7 has a cross-sectional shape corresponding to the cross-sectional shape of the fitting hole 45c, and is inserted into the fitting hole 45c. Thus, the output shaft 7 rotates integrally with the end plate 45. On an upper end face of the output shaft 7, a attachment hole 7b is formed for attaching the cover 46 thereto. On the other hand, a portion of the output shaft 7 protruding outward from the unit housing 41 is formed with the gear 7a, as described above. The gear 7a is meshed with the fan-shaped gear 8a of the lifting mechanism 8 (see FIG. 12).

The cover 46, which is made of a metal plate, is mounted on the unit housing 41 so as to cover openings of the first accommodating portion 54 and the second accommodating portion 53. The cover 46 comprises two bosses 46a, 46b. These bosses 46a, 46b are fitted into the attachment hole 7b of the output shaft 7 and the attachment hole 54b of the supporting cylinder 54a to position the cover 46 with respect to the unit housing 41. By attaching the cover 46 on the unit housing 41, parts within the unit housing 41 are restricted in axial movements.

Next, explanation will be given of the operation of the power window apparatus constructed as described above.

As the motor 5 is started, the rotating shaft 13 integrally rotates the driving rotor 23 of the clutch 21. The driving rotor 23 causes the driven rotor 25 to rotate together. In this event, as previously explained with reference to FIGS. 7(a) and 7(b), the roller 26 is maintained in the free state, thus allowing the rotation of the driven rotor 25 relative to the clutch housing 22.

The driven rotor 25 integrally rotates the worm shaft 56. The rotation of the worm shaft 56 is transmitted to the output shaft 7 through the worm wheel 43, the helical gear 42, the buffer member 44 and the end plate 45. The worm shaft 56, the worm wheel 43 and the helical gear 42, which comprise the worm gear mechanism, decelerate the rotation of the rotating shaft 13 before it is transmitted to the output shaft 7. In other words, the worm gear mechanism amplifies the torque of the rotating shaft 13 before it is transmitted to the output shaft 7. With the rotation of the output shaft 7, the lifting mechanism 8 is driven to open or close the window-pane 9.

On the other hand, when external force is applied to the windowpane 9 while the motor 5 is being stopped, the external force is transmitted to the output shaft 7 through the lifting mechanism 8 to rotate the output shaft 7. The rotation of the output shaft 7 is transmitted to the driven rotor 25 through the end plate 45, the buffer member 44, the helical gear 42, the worm wheel 43 and the worm shaft 56. In this event, as previously explained with reference to FIGS. 8(a) and 8(b), the roller 26 is held between the restriction face 35c of the driven engagement body 35 and the inner peripheral face of the clutch housing 22, and thus brought into the lock state. When the roller 26 is in the lock state, the rotation of the driven rotor 25 relative to the clutch housing 22 is blocked. The clutch housing 22 is mounted to the unit housing 41 of the output unit 6 in a manner disabling the rotation. Therefore, the driven rotor 25 is locked such that it cannot rotate relative to the unit housing 41. This results in blocking movements of the worm shaft 56, the worm wheel 43, the helical gear 42, the buffer member 44, the end plate 45, the output shaft 7, the lifting mechanism 8 and the windowpane 9. It is therefore impossible to open or close the windowpane 9 with the external force. Of course, neither the driving rotor 23 nor the rotating shaft 13 of the motor 5 coupled thereto rotates.

In this way, while the clutch 21 allows the transmission of the rotation from the motor 5 to the output unit 6, it prevents movements of the output unit 6 based on force applied to the lifting mechanism 8 (driven device) to block the transmission of the rotation from the output unit 6 to the motor 5.

This embodiment has advantages shown below.

The clutch 21 is located between the rotating shaft 13 of the motor 5 and the worm shaft 56. A torque generated by the rotating shaft 13 and the worm shaft 56 coupled thereto through the clutch 21 is extremely smaller than a torque generated by the worm wheel 43 and the helical gear 42. Therefore, a small load is applied to the clutch 21 between the rotating shaft 13 and the worm shaft 56. For this reason, the clutch 21 is not required to have a very high strength, so that the clutch 21 can be reduced in size by decreasing the strength required for the clutch 21. As a result, it is possible to reduce the size and cost of the driving apparatus 1.

The rotating shaft 13 and the worm shaft 56 are coupled through the clutch 21, and are originally separated in the manufacturing steps of the driving apparatus 1. Therefore, for assembling the driving apparatus 1, the three separately managed units, i.e., the motor 5 with the rotating shaft 13, the output unit 6 with the worm shaft 56, and the clutch 21 can be readily assembled. In addition, the management of these three units 5, 6, 21 is also facilitated.

For assembling the driving apparatus 1, the clutch 21 is first mounted to the mounting cylinder 57 of the output unit 6, and the driven rotor 25 is fitted into the worm shaft 56. Next, the motor 5 is mounted to the fitting cylinder 51 of the output unit 6, and the rotating shaft 13 is fitted into the driving rotor 23. When the motor 5 is coupled to the output unit 6, the rotating shaft 13 should be essentially positioned coaxially with the worm shaft 56. Nevertheless, a slight misalignment may occur between the rotating shaft 13 and the worm shaft 56.

In this embodiment, however, there is a slight gap existing between the inner peripheral face of the clutch housing 22 and the outer peripheral face of the driving rot or 23. This gap allows the driving rotor 23 to move in the radial direction relative to the clutch housing 22. Therefore, the misalignment between the rotating shaft 13 and the worm shaft 56 is compensated for by the radial movement of the driving rotor 23 relative to the clutch housing 22. In other words, the clutch 21 also functions as a mechanism for compensating for the misalignment between the rotating shaft 13 and the worm shaft 56. Therefore, no dedicated feature need be separately provided for compensating for such misalignment, thereby making it possible to reduce the cost of the driving apparatus 1.

The misalignment between the rotating shaft 13 and the worm shaft 56 results from the fact that both shafts 13, 56 are separate parts. However, by allowing the misalignment between both shafts 13, 56 and compensating for the misalignment by means of the clutch 21, it is possible to prevent excessive force from being applied to both shafts 13, 56. This permits smooth rotation of both shafts 13, 56.

Supposing that the rotating shaft 13 and the worm shaft 56 are formed along a single common shaft, bending force may be applied to the common shaft when the motor 5 is coupled to the output unit 6. This would not only make impossible At smooth rotation of the common shaft but also burden a bearing which receives the common shaft For this reason, a complicated bearing structure need be employed. In contrast, this embodiment, which has the rotating shaft 13 and the worm shaft 56 formed as separate parts, is free from such problem.

The mounting cylinder 57 for supporting one end of the worm shaft 56 also serves as a member for fixing the clutch 21 to the output unit 6. Therefore, a dedicated member need not be provided for fixing the clutch 21 to the output unit 6, thus contributing to a reduction in the cost of the driving apparatus 1.

Since the clutch 21 is mounted to the mounting cylinder 57 for supporting the worm shaft 56, the clutch 21, more specifically, the driven rotor 25 can be readily positioned to be coaxial with the worm shaft 56, thereby avoiding misalignment between the driven rotor 25 and the worm shaft 56. This results in prevention of strange noise and vibrations associated with the misalignment between the driven rotor 25 and the worm shaft 56.

The clutch housing 22 and the mounting cylinder 57 have the splines 22d, 57d, respectively. Both splines 22d, 57a are engaged with each other to prevent without fail the rotation of the clutch housing 22 relative to the mounting cylinder 57, i.e., the unit housing 41.

The buffer member 44 made of rubber is provided between the helical gear 42 and the end plate 45. The elasticity of the buffer member 44 allows relative movements between the helical gear 42 and the end plate 45. For example, when the windowpane 9 is applied with the load, this prevents the load from being impulsively transmitted to respective parts comprising the output unit 6 and the motor 5. Particularly, the impulse is prevented from being applied to the teeth of the respective parts 42, 43, 56 comprising the worm gear mechanism, thereby ensuring smooth movements of these parts.

The three driving engagement bodies 31a come in contact with the three driven engagement bodies 35 corresponding thereto, respectively, to transmit power from the driving rotor 23 to the driven rotor 25. Since the respective driving engagement bodies 31a are in contact with the driven engagement bodies 35 corresponding thereto over relatively wide areas, relatively small force is applied to both engagement bodies 31a, 35 per unit area. This improves the durability of the driving rotor 23 and the driven rotor 25. Stated another way, the strengths required for the driving rotor 23 and the driven rotor 25 can be reduced, so that the driving rotor 23, in particular, can be molded of a synthetic resin which is light in weight, inexpensive, and easy to manufacture.

The rollers 26 of the clutch 21 are in the lock state only when force is transmitted from the lifting mechanism 8 to the output unit 6. The rollers 26 are in the free state when the power is transmitted from the motor 5 to the output unit 6. Supposing the employment of a clutch which is constructed such that the rollers 26 are brought into the lock state even when the power is transmitted from the motor 5 to the output unit 6, the rollers 26 and the members for locking the rollers 26 tend to be charged with a burden. In this respect, the clutch 21 of this embodiment, in which the rollers 26 are brought into the lock state only when the power is transmitted from the lifting mechanism 8 to the output unit 6, is superior in durability.

The rollers 26 formed in a cylindrical shape, is in linear contact with the inner peripheral face of the clutch housing 22 and the restriction faces 35c of the driven engagement body 35 in its lock state. Therefore, in comparison with the case where a ball is used in place of the cylindrical roller 26, for example, the lock state can be more reliably provided.

Both ends of the roller 26 are tapered, so that both end faces of the roller 26 have a reduced area. Therefore, the contact areas of the roller 26 with the support ring 27 and the bottom plate 22b of the clutch housing 22 are smaller. This reduces a sliding resistance of the roller 26 to the support ring 27 and the bottom plate 22b, permits smooth movements of the clutch 21, and reduces noise.

The support ring 27 in contact with the roller 26 is made of a resin material. This reduces sliding noise generated between the support ring 27 and the roller 26 more than the support ring 27 made, for example, of metal.

Second Embodiment

Figure 13:
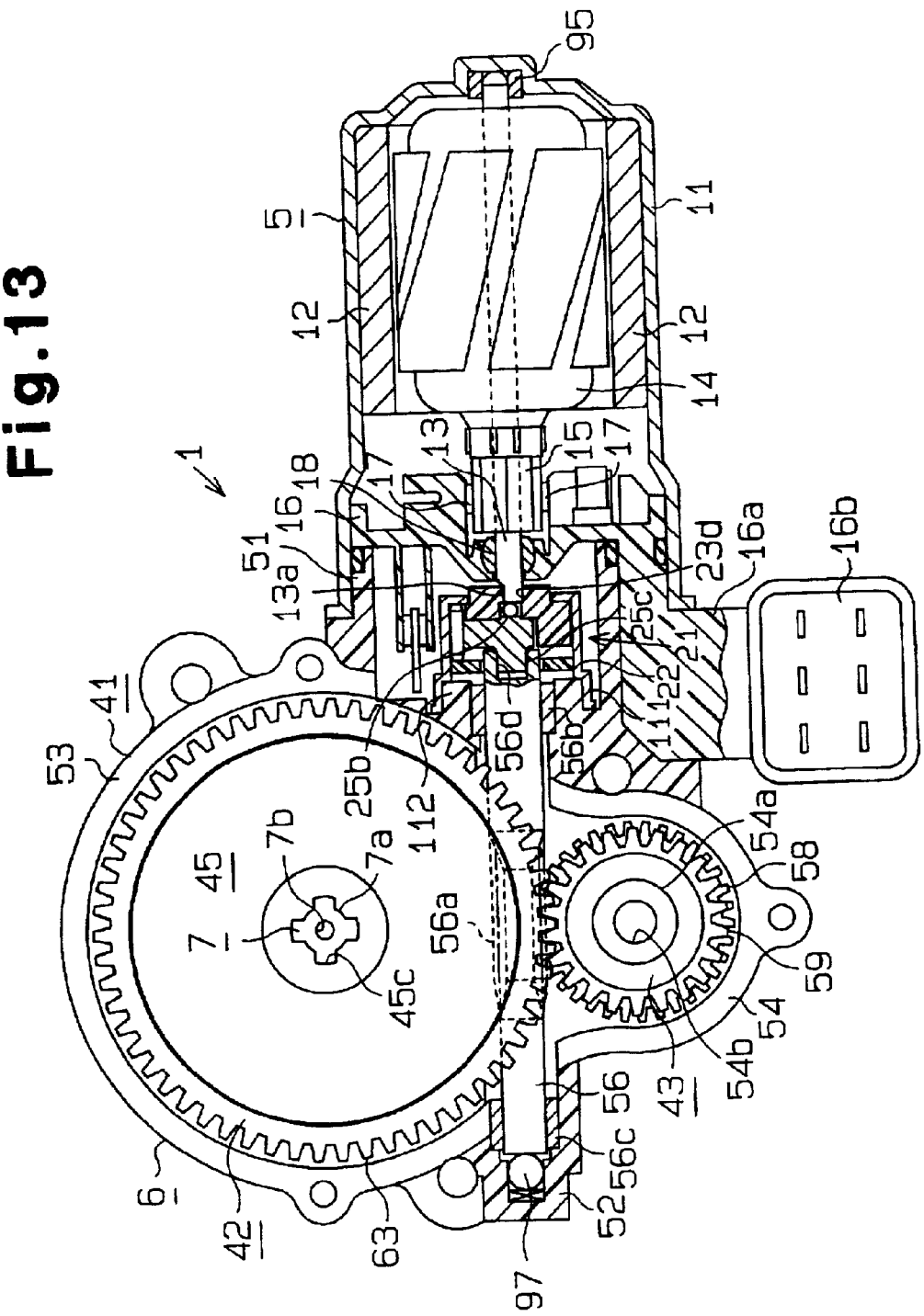
FIG. 13 is a plane cross-sectional view of a driving apparatus according to a second embodiment of the present invention.
Figure 14:
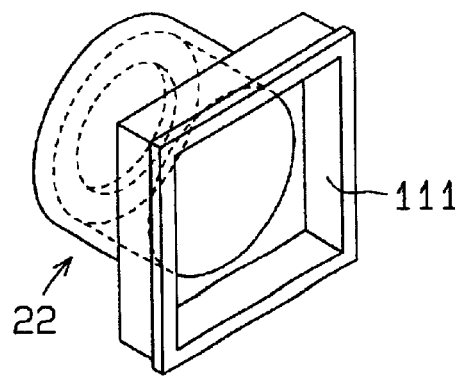
FIG. 14 is a perspective view illustrating a clutch housing provided in the driving apparatus of FIG. 13.
Figure 15:
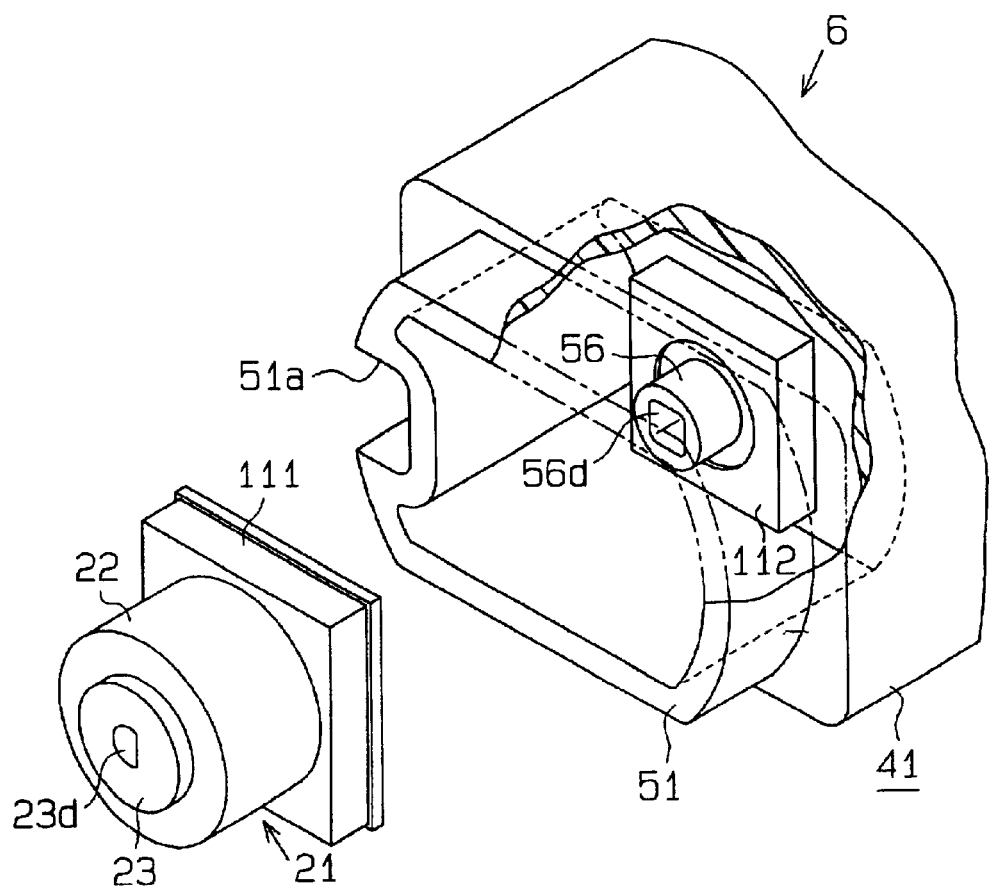
FIG. 15 is an exploded perspective view illustrating a mechanism for coupling an output unit with a clutch in the driving apparatus of FIG. 13.

Next, a driving apparatus 1 according to a second embodiment of the present invention will be described with reference to FIGS. 13 through 15. This embodiment is an example of modifications to the embodiment of FIGS. 1 through 12. Specifically, in the embodiment of FIGS. 1 through 12, both splines 22d, 57a are engaged with each other to mount the clutch housing 22 to the mounting cylinder 57 of the unit housing 41 in a manner disabling the rotation. On the other hand, in this embodiment, as illustrated in FIGS. 13 through 15, a fitting frame 111 in a generally rectangular shape is formed at an open end of the clutch housing 22. The unit housing 41 has a fitting protrusion 112 having a shape corresponding to the fitting frame 111. The fitting frame 111 is fitted on the fitting protrusion 112 to attach the clutch housing 22 to the unit housing 41 in a manner disabling the rotation. The fitting frame 111 and the fitting protrusion 112 comprise engaging means. The fitting frame 111 and the fitting protrusion 112 corresponding thereto may be formed in a polygonal shape other than the rectangular shape.

Third Embodiment

Figure 16:
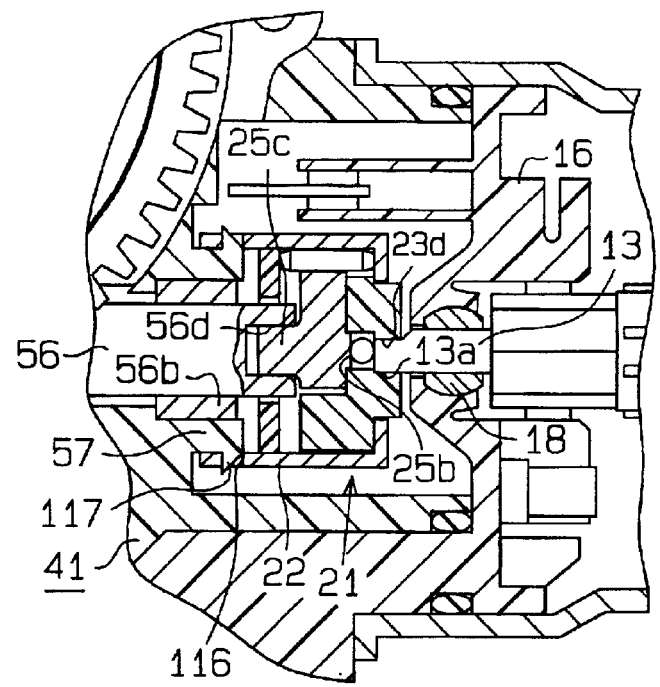
FIG. 16 is a partial cross-sectional view illustrating a driving apparatus according to a third embodiment of the present invention.

Next, a driving apparatus 1 according to a third embodiment of the present invention will be described with reference to FIG. 16. This embodiment is an example of modifications to the embodiment of FIGS. 1 through 12. Specifically, as illustrated in FIG. 16, a plurality of stopper holes 116 are formed on a peripheral wall near an open end of the clutch housing 22. A plurality of stopper tabs 117 corresponding to the stopper holes 116 are formed on the outer peripheral face of the mounting cylinder 57 of the unit housing 41. By engaging the stopper tabs 117 with the stopper holes 116, the clutch housing 22 is attached to the unit housing 41 without fail, thereby preventing the clutch housing 22 from inadvertently coming off the unit housing 41. It is also ensured to block the rotation of the unit housing 41 relative to the clutch housing 22. The stopper holes 116 and the stopper tabs 117 comprise engaging means. Reverse to FIG. 16, the stopper holes may be provided on the peripheral wall of the mounting cylinder 57, and the stopper tabs may be provided on the inner peripheral face of the clutch housing 22.

Fourth Embodiment

Figure 17:
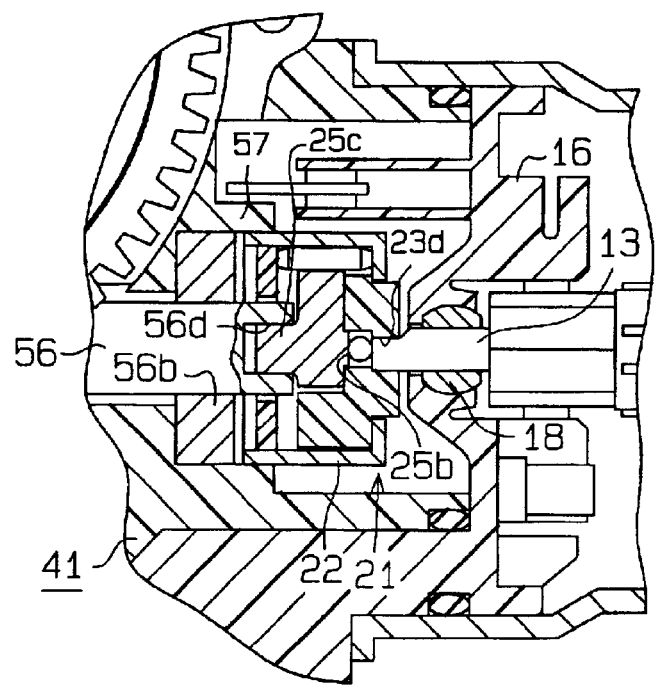
FIG. 17 is a partial cross-sectional view illustrating a driving apparatus according to a fourth embodiment of the present invention.

Next, a driving apparatus 1 according to a fourth embodiment of the present invention will be described with reference to FIG. 17. This embodiment is an example of modifications to the embodiment of FIGS. 1 through 12. Specifically, as illustrated in FIG. 17, in this embodiment, the clutch housing 22 is fitted into the mounting cylinder 57, reverse to the embodiment of FIGS. 1 through 12.

Fifth Embodiment

Next, a driving apparatus 1 according to a fifth embodiment of the present invention will be described with reference to FIGS. 18 through 20, centered on differences with the embodiment of FIGS. 1 through 12. Equivalent members to those in the embodiment of FIGS. 1 through 12 are designated the same reference numerals.

In the embodiment of FIG. 1 through 12, the clutch 21 is fixed to the output unit 6. In this embodiment, on the other hand, a clutch 71 is fixed to the motor 5. Specifically, as illustrated in FIG. 19, the clutch 71 comprises a cylindrical clutch housing 72 having a shaft hole 72a at one end. The fitting shaft 25c of the driven rotor 25 is fitted into the worm shaft 56 through the shaft hole 72a (see FIG. 18). It should be noted that the clutch 71 illustrated in FIG. 19 does not include a member corresponding to the support ring 27 of the clutch 21 illustrated in FIG. 4.

Figure 20:
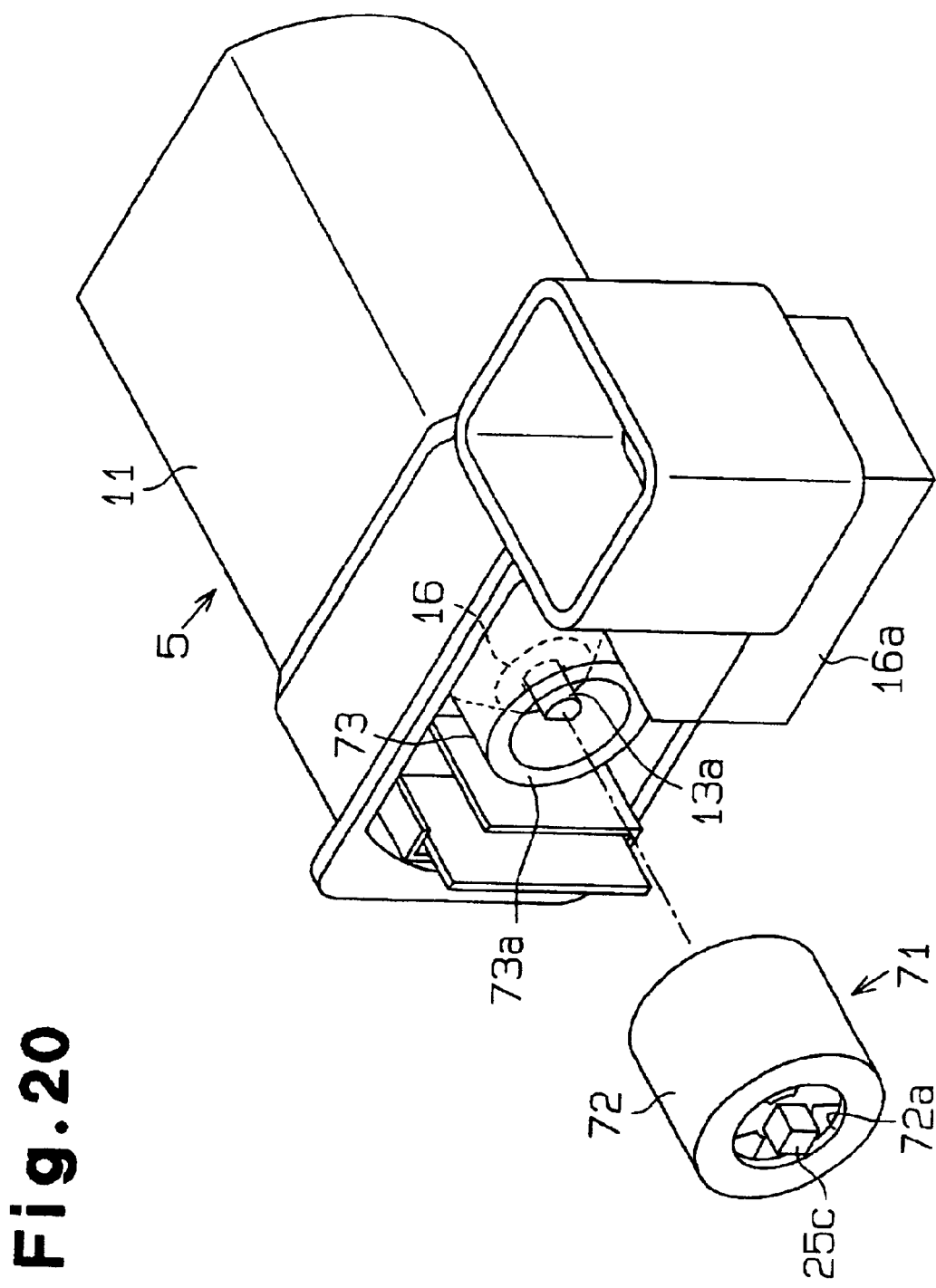
FIG. 20 is an exploded perspective view illustrating a mechanism for coupling a motor with a clutch in the driving apparatus of FIG. 18.

As illustrated in FIG. 20, the brush holder 16 of the motor 5 is provided with a mounting cylinder 73 which is positioned coaxially with the rotating shaft 13. The outer diameter of the mounting cylinder 73 is slightly larger than the inner diameter of the clutch housing 72. The mounting cylinder 73 is press fitted into the clutch housing 72 to fix the clutch housing 72 to the motor 5 in a manner disabling the rotation. A distal end face 73a of the mounting cylinder 73 is an annular flat face. When the mounting cylinder 73 is press fitted into the clutch housing 72, the distal end face 73a comes in contact with one end face of the roller 26 (see FIG. 18). Therefore, the roller 26 is restricted in axial movements by the distal end face 73a. Simultaneously, the rotating shaft 13 is fitted into the driving rotor 23.

This embodiment has substantially similar actions and effects to the embodiment of FIGS. 1 through 12. Particularly, in this embodiment, the axial movements of the roller 26 are restricted by the front end face 73a of the mounting cylinder 73 used for mounting the clutch 71. Therefore, no member need be separately provided for restricting the axial movements of the roller 26, so that the structure of the driving apparatus 1 can be simplified. Of course, a dedicated member may be added to the driving apparatus 1 of this embodiment for restricting the axial movements of the roller 26 without departing from the gist of the present invention.

In this embodiment, like the embodiment of FIGS. 1 through 12, splines may be formed on the outer peripheral face of the mounting cylinder 73, and splines may be formed on the inner peripheral face of the clutch housing 72, so that the clutch housing 72 is fixed to the motor 5 by engagement of both the splines with each other in a manner disabling the rotation. Also, in the embodiment of FIGS. 1 through 12, the mounting cylinder 57 may be press fitted into the clutch housing 22 without providing the mounting cylinder 57 and the clutch housing 22 with splines, in a manner similar to this embodiment.

Sixth Embodiment

Figure 21:
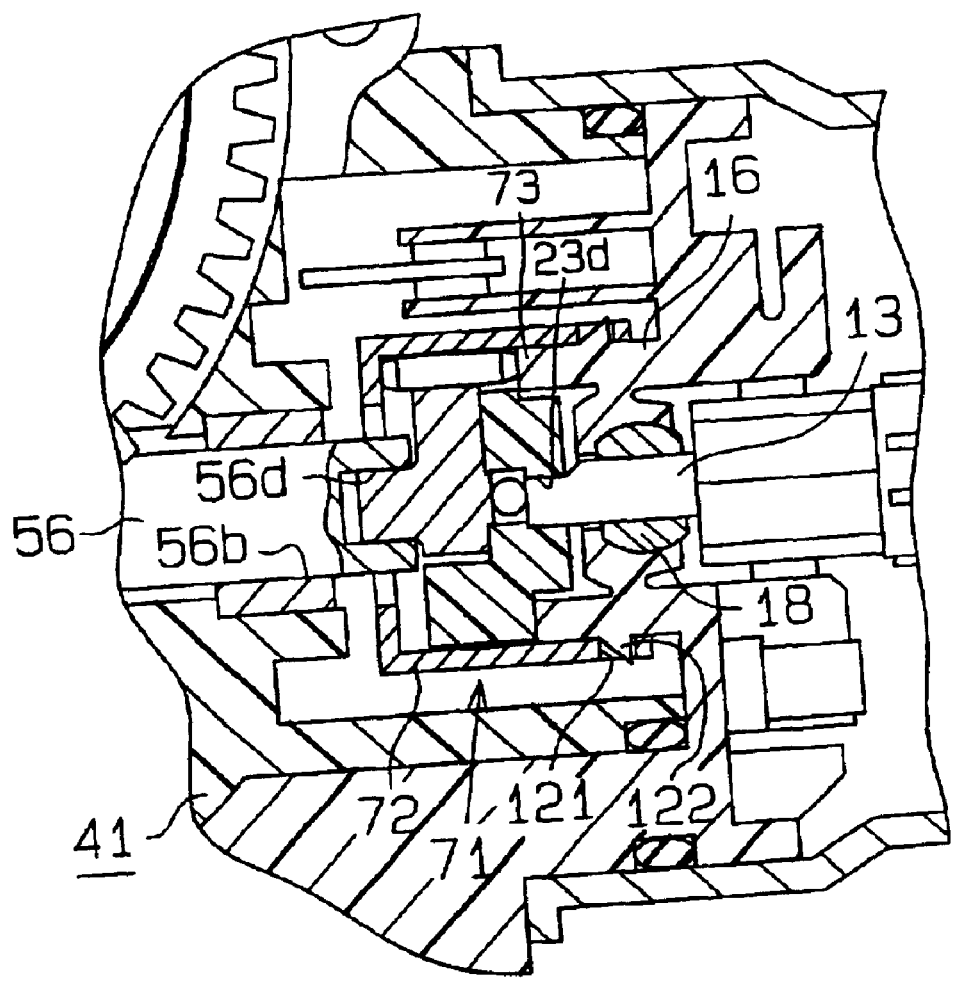
FIG. 21 is a partial cross-sectional view illustrating a driving apparatus according to a sixth embodiment of the present invention.

Next, a driving apparatus 1 according to a sixth embodiment of the present invention will be described with reference to FIG. 21. This embodiment is an example of modifications to the embodiment of FIGS. 18 through 20. Specifically, as illustrated in FIG. 21, in this embodiment, a plurality of stopper holes 121 are formed on the peripheral wall near the open end of the clutch housing 72, as described in connection with the embodiment of FIG. 16. A plurality of stopper tabs 122 corresponding to the stopper holes 121, respectively, are formed on the outer peripheral face of the mounting cylinder 73. The stopper tabs 122 are received by the stopper holes 121 to attach the clutch housing 72 to the motor 5 without fail, thereby preventing the clutch housing 72 from inadvertently coming off the motor 5. It is also ensured to block the rotation of the clutch housing 72 relative to the mounting cylinder 73. The stopper holes 121 and the stopper tabs 122 comprise engaging means. Reverse to FIG. 21, the stopper holes may be provided on the peripheral wall of the mounting cylinder 73, and the stopper tabs may be provided on the inner peripheral face of the clutch housing 72.

Figure 18:
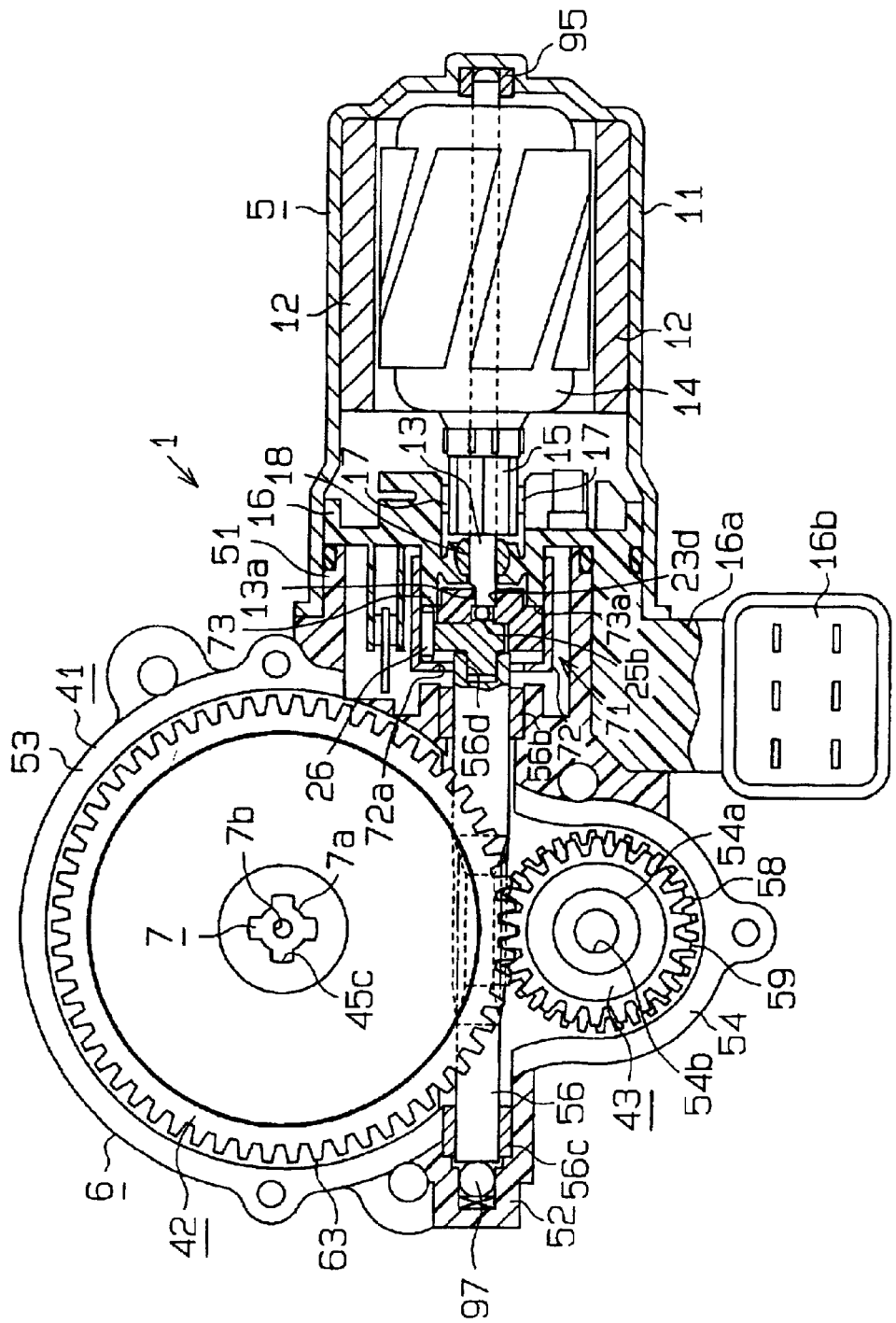
FIG. 18 is a cross-sectional view illustrating a driving apparatus according to a fifth embodiment of the present invention.

The structure of the embodiment of FIGS. 13 through 15, or the structure of the embodiment of FIG. 17, as well as the structure of embodiment of FIG. 16 may be applied to the embodiment of FIGS. 18 through 20 in which the clutch 71 is fixed to the motor 5.

Seventh Embodiment

Next, a driving apparatus 1 according to a seventh embodiment of the present invention will be described with reference to FIGS. 22 through 24, centered on differences with the embodiment of FIGS. 1 through 12. Equivalent members to those in the embodiment of FIGS. 1 through 12 are designated the same reference numerals.

Figure 23:
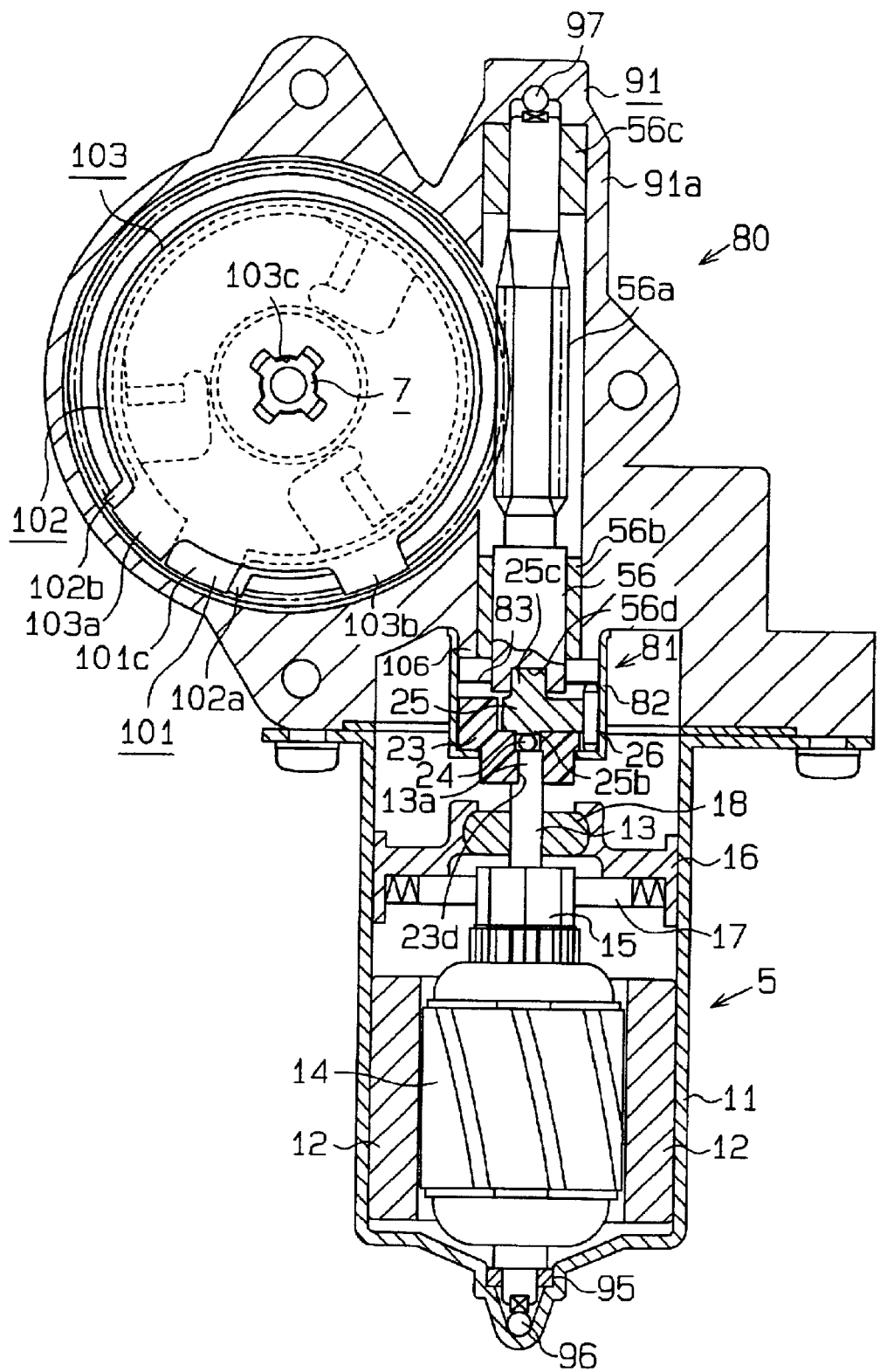
FIG. 23 is a plane cross-sectional view of the driving apparatus of FIG. 22.

As illustrated in FIG. 23, while the motor 5 in this embodiment is substantially the same as the motor 5 illustrated in FIG. 2, it also comprises a thrust bearing 96 located between the proximal end of the rotating shaft 13 and the motor housing 11. The thrust bearing 96 receives axial force acting on the rotating shaft 13.

Figure 24:
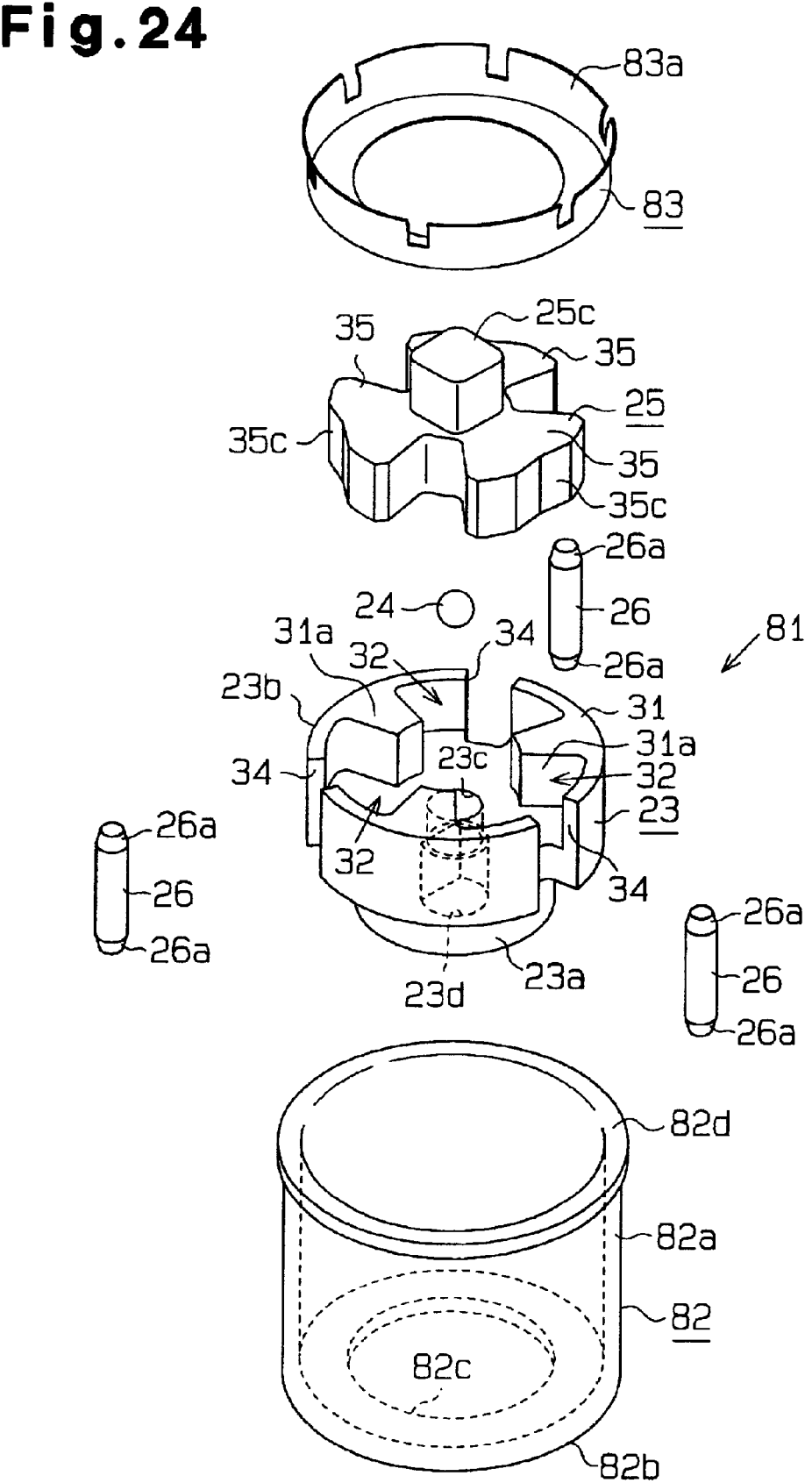
FIG. 24 is an exploded perspective view illustrating a clutch located in the driving apparatus of FIG. 22.

As illustrated in FIG. 24, a clutch 81 in this embodiment comprises a clutch housing 82 which has a cylindrical body 82a and a bottom plate 82b. A shaft hole 82c is formed at the center of the bottom plate 82b. The smaller diameter portion 23a of the driving rotor 23 is inserted through the shaft hole 82c. The cylinder 82a has a diverging fitting portion 82d at an open end thereof.

The clutch 81 also has an annular support washer 83 corresponding to the support ring 27 of the clutch 21 illustrated in FIG. 4. The support washer 83 is comprised, for example, of a metal plate, and has an annular and diverging fitting portion 83a. The support washer 83 is inserted into the clutch housing 82 from an opening of the clutch housing 82. In this event, the fitting portion 83a elastically presses the inner peripheral face of the clutch housing 82 to fix the support washer 83 in the clutch housing 82 (see FIG. 23). With the support washer 83, the driving rotor 23, the driven rotor 25, the ball 24 and the roller 26 are held in the clutch housing 82. Particularly, the roller 26 is restricted in axial movements by the bottom plate 82b of the clutch housing 82 and the support washer 83.

Figure 22:
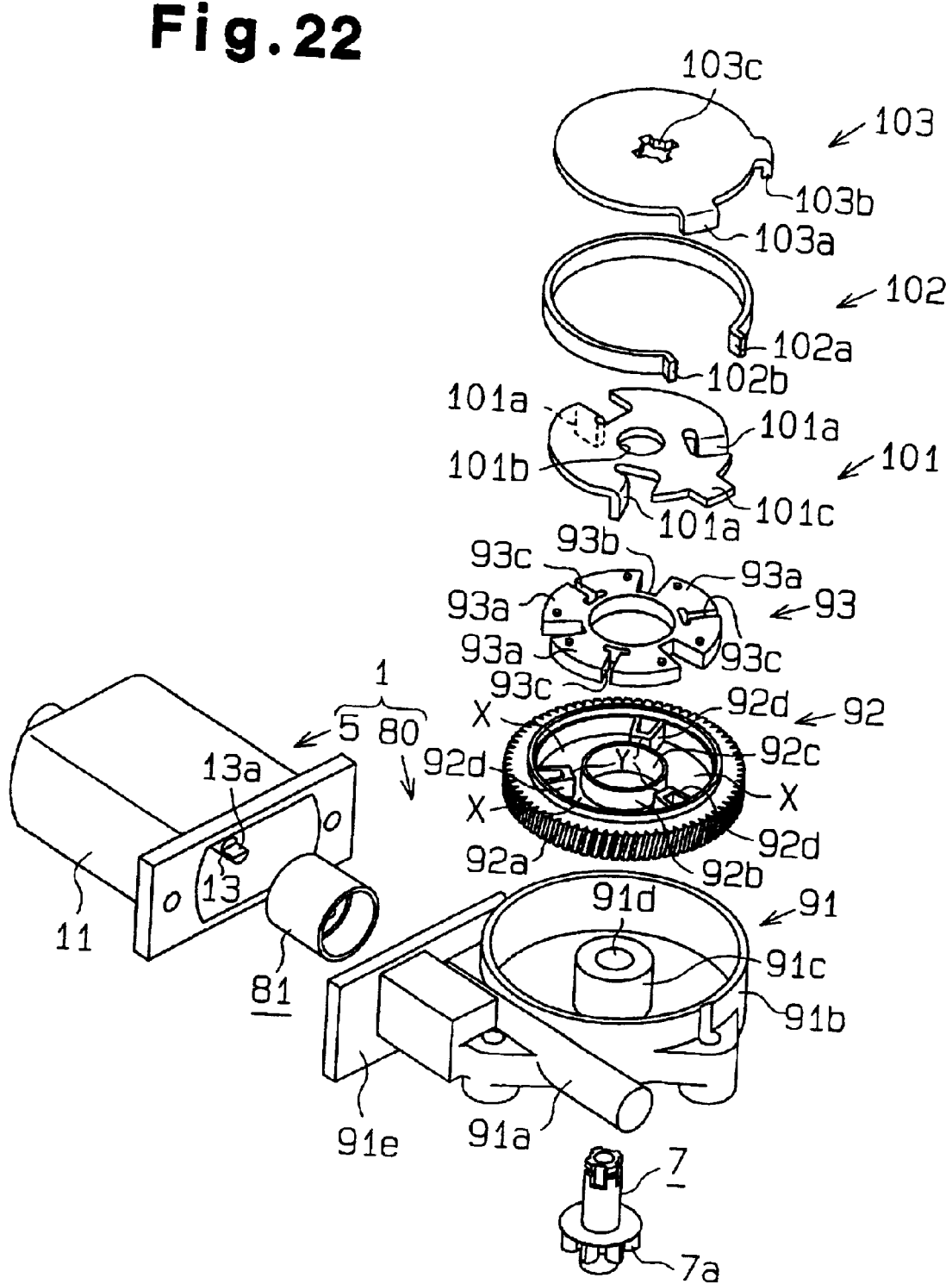
FIG. 22 is a cross-sectional view illustrating a driving apparatus according to a seventh embodiment of the present invention.

As illustrated in FIGS. 22 and 23, the output unit 80 comprises a unit housing 91, the worm shaft 56, a worm wheel 92, a buffer member 93, a transmission plate 101, a ring spring 102, an output plate 103, and the output shaft 7. The worm shaft 56 and the worm wheel 92 comprise a worm gear mechanism which functions as a decelerating mechanism and a torque amplifying mechanism. The unit housing 91 comprises a flange 91e for mounting the motor housing 11. The flange 91e is fixed to the motor housing 11 with a screw or a bolt.

The unit housing 91 comprises a worm accommodating portion 91a in a closed cylinder shape for accommodating the worm shaft 56. As illustrated in FIG. 23, the worm shaft 56 is rotatably supported by a pair of slide bearings 56b, 56c in the worm accommodating portion 91a. A support for supporting one end of the worm accommodating portion 91a, in other words, one end of the worm shaft 56, forms a mounting cylinder 106 for mounting the clutch housing 82. The fitting portion 82d of the clutch housing 82 is fitted on the mounting cylinder 106 in a manner disabling the rotation.

As illustrated in FIG. 22 and 23, the unit housing 91 comprises a wheel accommodating portion 91b for accommodating the worm wheel 92. The wheel accommodating portion 91b has a generally closed cylindrical shape, with a support cylinder 91c being implanted on its inner bottom. The support cylinder 91c has a shaft hole 91d for rotatably supporting the output shaft 7.

The worm wheel 92, which is made of a resin material, includes a gear wheel 92a having a cylindrical body and an annular bottom plate, and a central cylindrical body 92b extending from the bottom plate of the gear wheel 92a. The support cylinder 91c is fitted into the shaft hole 92c of the cylindrical body 92b to rotatably support the worm wheel 92 by the support cylinder 91c in the wheel accommodating portion 91b. In this event, the gear wheel 92a is meshed with spiral teeth 56a of the worm shaft 56.

Three holding walls 92a arranged at equal angular intervals (120°) extend in radial directions from the inner peripheral face of the gear wheel 92a to the cylindrical body 92b. A holding chamber X is formed between two adjacent holding walls 92d. Further, a coupling groove Y for coupling two adjacent holding chambers X is formed between each holding wall 92d and the outer peripheral face of the cylindrical body 92b.

The buffer member 93, which is made of rubber, is located in the worm wheel 92. The buffer member 93 includes three fan-shaped rubber segments 93a arranged at equal angular intervals (120°), and elongated coupling rubbers 93b for coupling two adjacent rubber segments 93a to each other, and is generally has an annular shape. The rubber segments 93a are located in the respective holding chambers X, and the coupling rubbers 93b are located in the respective coupling grooves Y. Therefore, the buffer member 93 is mounted to the worm wheel 92 for rotation integral therewith. Each of the rubber segments 93a has a radially extending slit 93c at an intermediate location in the circumferential direction.

The transmission plate 101, which is comprised of a generally disc-shaped metal plate, is mounted on the worm wheel 92 to hold the buffer member 93 therebetween. The transmission plate 101 has three stopper pieces 101a which are bent to extend in the axial direction. When the transmission plate 101 is mounted on the worm wheel 92, these stopper pieces 101a are engaged with the slits 93c of the buffer member 93, respectively. Therefore, the rotation of the worm wheel 92 is transmitted to the transmission plate 101 through the buffer member 93, causing the transmission plate 101 to rotate integrally with the worm wheel 92.

The transmission plate 101 has at the center thereof a shaft hole 101b which allows the output shaft 7 to be inserted therethrough. The transmission plate 101 further has a first transmission piece 101c which extends in a radial direction from the outer peripheral edge of the plate 101.

The ring spring 102 is comprised of a ring-shaped spring member, a portion of which is cut away. The ring spring 102 has at both ends thereof a first engagement piece 102a and a second engagement piece 102b which are bent to extend outward in radial directions. The ring spring 102 is positioned along the transmission plate 101 such that the first engagement piece 102a comes in contact with the first transmission piece 101c of the transmission plate 101 (see FIG. 23).

The output plate 103 is comprised of a generally disc-shaped metal plate having a diameter larger than the diameter of the transmission plate 101. The output plate 103 has on its outer peripheral edge a second transmission piece 103a and a restriction piece 103b which are bent to extend in the axial direction. The second transmission piece 103a and the restriction piece 103b are spaced apart by a predetermined angular distance. The output plate 103 is carried on the transmission plate 101 such that the second transmission piece 103a is positioned between the first transmission piece 101c of the transmission plate 101 and the second engagement piece 102b of the ring spring 102 (see FIG. 23). In this event, the restriction piece 103b of the output plate 103 is located outside of the outer peripheral face of the ring spring 102.

With the worm wheel 92, the buffer member 93, the transmission plate 101, the ring spring 102 and the output plate 103 accommodated in the wheel accommodating portion 91b, the opening of the wheel accommodating portion 91b is covered with a lid, not shown.

The output plate 103 has a fitting hole 103c of a cross shape in cross section at a central location thereof. The output shaft 7 is inserted into the support cylinder 91c of the wheel accommodating portion 91b from the bottom of the unit housing 91, such that the upper end protrudes upward from the supporting cylinder 91c. The upper end of the output shaft 7 is further inserted through the shaft hole 101b of the transmission plate 101 and fitted into the fitting hole 103c. Therefore, the output shaft 7 rotates integrally with the output plate 103.

The rotation of the rotating shaft 13 of the motor 5 is transmitted to the transmission plate 101 through the clutch 81, the worm shaft 56, the worm wheel 92 and the buffer member 93. As the transmission plate 101 rotates in the clockwise direction in FIG. 23, the first transmission piece 101c presses the second transmission piece 103a of the output plate 103 to rotate the output plate 103 in the clockwise direction. The output shaft 7, which rotates in the clockwise direction together with the output plate 103, drives the lifting mechanism 8 to move the windowpane 9 in an opening direction (downward direction in FIG. 12).

On the other hand, as the transmission plate 101 rotates in the counter clockwise direction in FIG. 23, the first transmission piece 101c presses the first engagement piece 102a of the ring spring 102 to rotate the ring spring 102 in the counter clockwise direction. The second engagement piece 102b of the ring spring 102 presses the second transmission piece 103a of the output plate 103 to rotate the output plate 103 in the counter clockwise direction. The output shaft 7, which rotates in the counter clockwise direction together with the output plate 103, drives the lifting mechanism 8 to move the windowpane 9 in a closing direction (upward direction in FIG. 12).

If a foreign matter is held, for example, between the windowpane 9 and the window frame of the door 2 while the windowpane 9 is moving in the closing direction, the windowpane 9 is blocked from moving, and associated with this, the rotations of the output shaft 7 and the output plate 103 are stopped. Thus, the second engagement piece 102b of the ring spring 102 in contact with the second transmission piece 103a of the output plate 103 is blocked from moving. On the other hand, since the motor 5 is still being driven, the first transmission piece 101c of the transmission plate 101 presses the first engagement piece 102a of the ring spring 102 to deflect the ring spring 102 to diverge. In this way, the deflected ring spring 102 allows the motor 5 to rotate in a state in which the windowpane 9 is blocked from moving in the closing direction. Stated another way, when force acts on the windowpane 9 to block its movement in the closing direction, the ring spring 102 functions to stop a further movement of the windowpane 9 in the closing direction, while allowing the motor 5 to rotate.

Elastic force produced by the deflected ring spring 102 acts as a rotation load of the motor 5 to slow down the rotational speed of the motor 5. When this change in the rotational speed is detected by a detector, not shown, a controller, also not shown, stops the motor 5.

As described above, the driving apparatus 1 of this embodiment functions to immediately stop a movement of the windowpane 9 when force acts on the windowpane 9 to block its movement in the closing direction, and subsequently stop the motor 5. Such a mechanism is referred to as a holding prevention mechanism. The rest of the driving apparatus 1 of this embodiment has substantially similar actions and effects to the embodiment of FIGS. 1 through 12.

Eighth Embodiment

Next, a driving apparatus 1 according to an eighth embodiment of the present invention will be described with reference to FIGS. 25 through 28. This embodiment is an example of modifications to the embodiment of FIGS. 22 through 24. Specifically, as illustrated in FIGS. 27 and 28, the clutch 81 in this embodiment comprises a spring washer 127 corresponding to the support washer 83 of the clutch 81 illustrated in FIG. 24. The spring washer 127 is made of a metal material, preferably, brass. The spring washer 127 comprises a cylindrical body 127a, and a pair of ring-shaped ribs 127b, 127c which extend from both peripheral edges of the cylindrical body 127a to the center of the cylindrical body 127a. The spring washer 127 is press fitted into the clutch housing 82 from the opening of the clutch housing 82, and fixed therein. The roller 26 is restricted in movements in the axial direction by the rib 127b of the spring washer 127 and the bottom plate 82b of the clutch housing 82.

Figure 26:
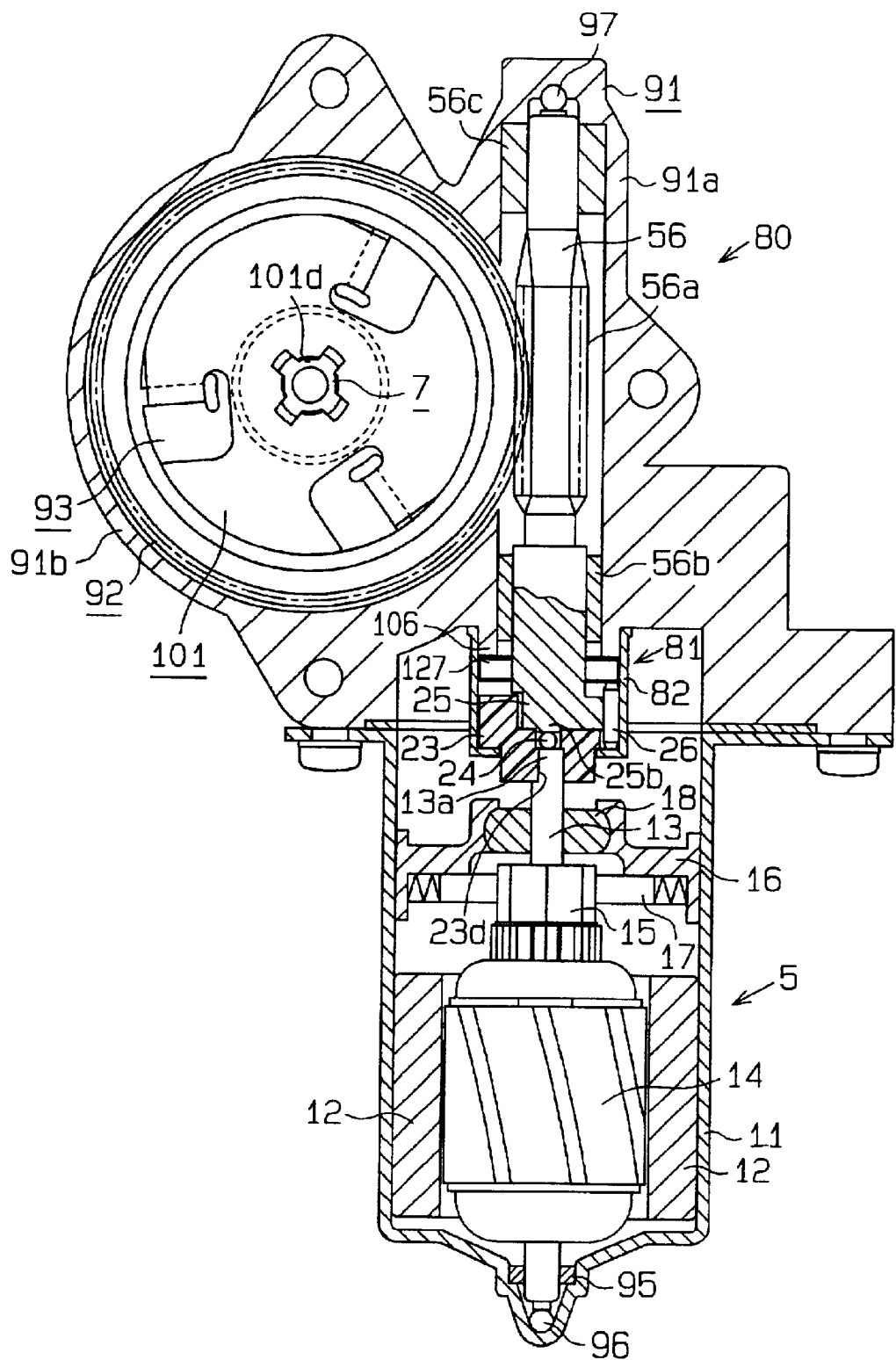
FIG. 26 is a plane cross-sectional view of the driving apparatus of FIG. 25.
Figure 27:
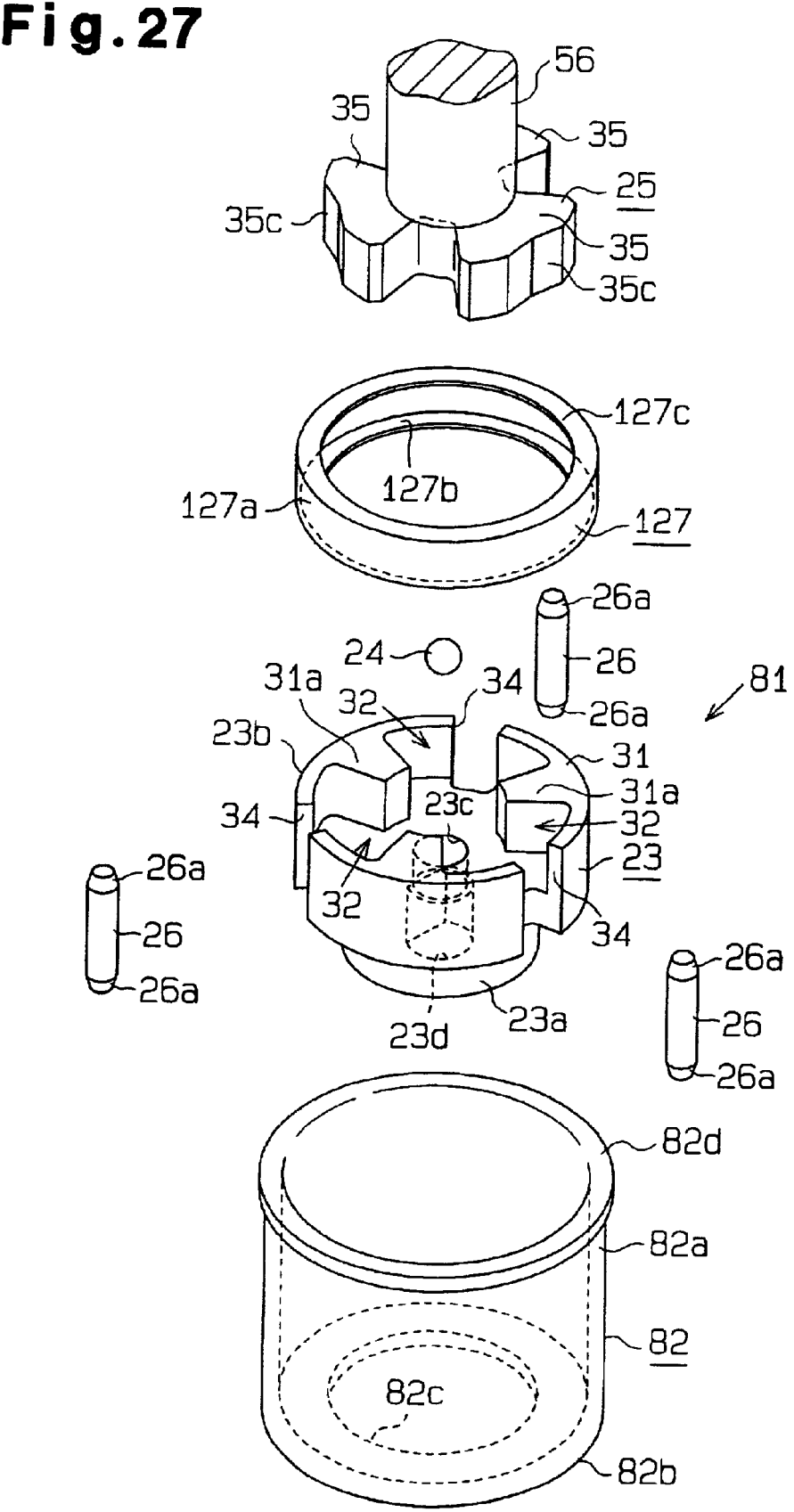
FIG. 27 is an exploded perspective view illustrating a clutch located in the driving apparatus of FIG. 25.
Figure 28:
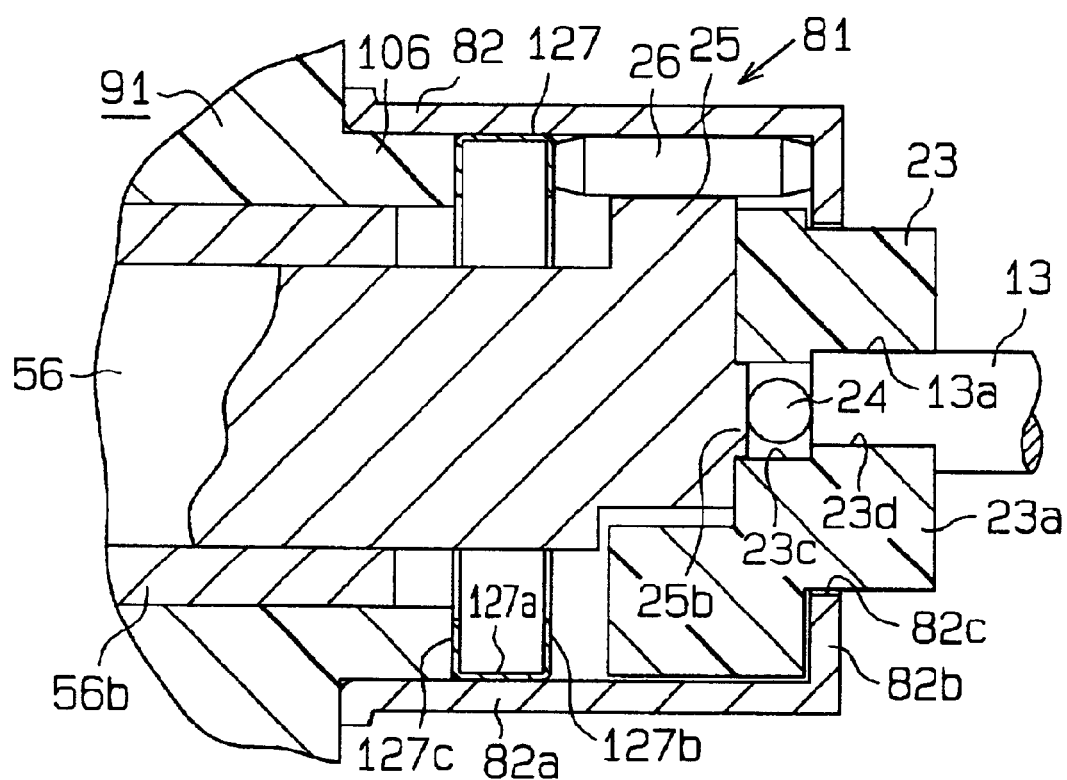
FIG. 28 is a partial cross-sectional view illustrating in an enlarged view a portion of the clutch in the driving apparatus of FIG. 26.

As illustrated in FIGS. 26 through 28, the driven rotor 25 is formed integrally with an end portion of the worm shaft 56. When the clutch 81 is assembled to the output unit 80, the clutch 81 is first assembled using parts except for the driven rotor 25. Next, the driven rotor 25 located at the end portion of the worm shaft 56 is inserted through the spring washer 127, and assembled to the driving rotor 23 in the clutch housing 82. In this state, the worm shaft 56 is inserted into the worm accommodating portion 91a of the unit housing 91. Simultaneously, the clutch housing 82 is fitted on the mounting cylinder 106 of the unit housing 91. Such a method provides smooth and easy assembling of the worm shaft 56 and the clutch 81 to the output unit 80.

As illustrated in FIG. 28, when the clutch housing 82 is fitted on the mounting cylinder 106, an end face of the mounting cylinder 106 presses the rib 127c of the spring washer 127. This causes the spring washer 127 to urge the roller 26 toward the bottom plate 82b of the clutch housing 82 through the rib 127b. As a result, the roller 26 becomes stable in posture and movement, so that the roller 26 smoothly transits from the free state to the lock state and vice versa.

Figure 25:
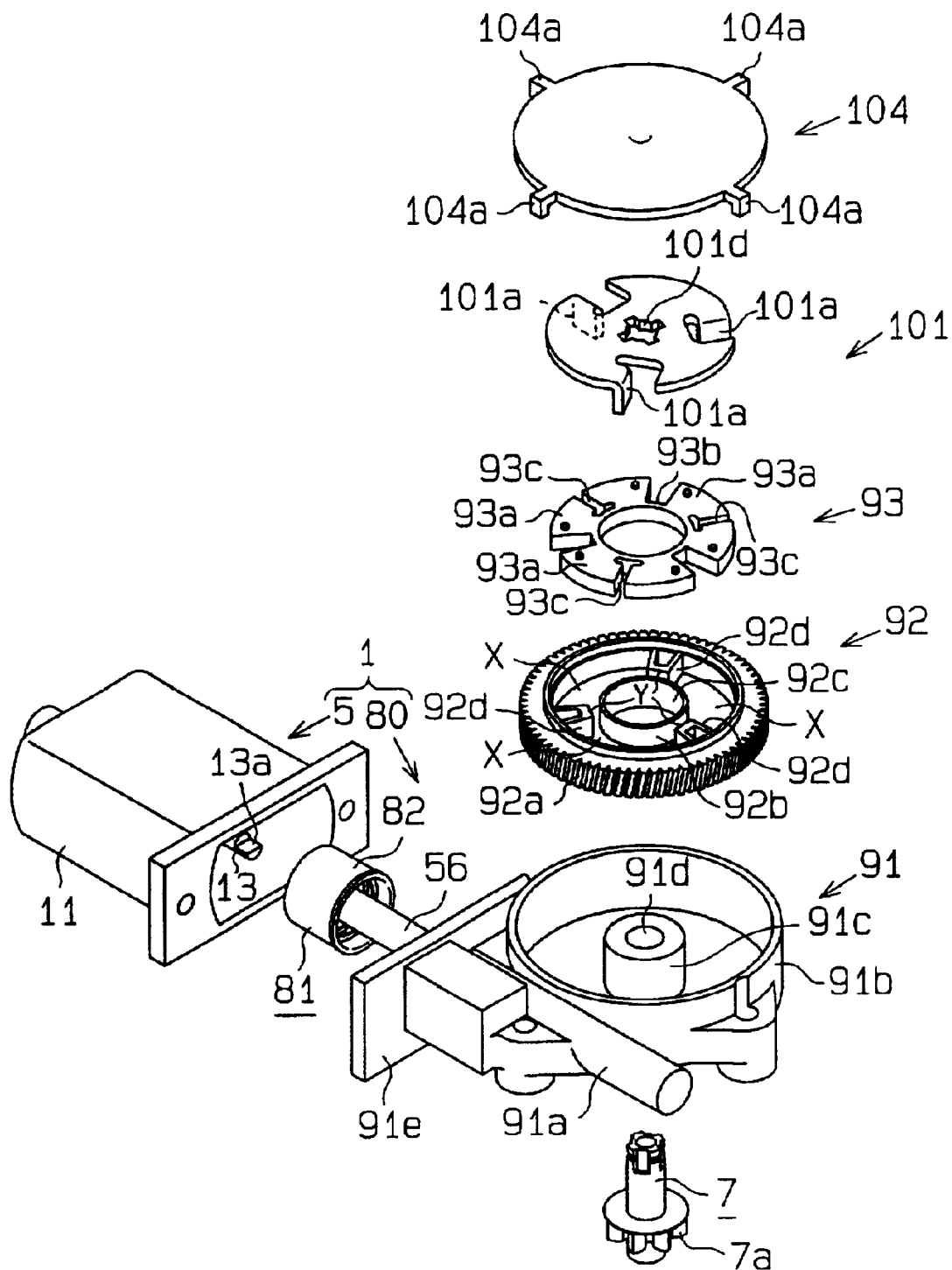
FIG. 25 is an exploded perspective view of a driving apparatus according to an eighth embodiment of the present invention.

As illustrated in FIGS. 25 and 26, the output unit 80 hi 20 in this embodiment does not include the ring spring 102 and the output plate 103 of the output unit 80 illustrated in FIG. 22. Also, the transmission plate 101 illustrated in FIG. 25 does not include the first transmission piece 101c in the transmission plate 101 illustrated in FIG. 22. Instead, the transmission plate 101 illustrated in FIG. 25 has a fitting hole 101d of a cross shape in cross section at a central location thereof into which an end of the output shaft 7 is fitted. Therefore, the rotation of the transmission plate 101 is directly transmitted to the output shaft 7.

The output unit 80 comprises a disc-shaped plate cover 104 for covering the opening of the wheel accommodating portion 91b. The plate cover 104 has four caulking pieces 104a on its outer peripheral edge. With the plate cover 104 carried on the wheel accommodating portion 91b, the caulking pieces 104a are caulked on the outer peripheral face of the wheel accommodating portion 91b to fix the plate cover 104 on the wheel accommodating portion 91b. The plate cover 104 restricts axial movements of the parts within the wheel accommodating portion 91b.

The driving apparatus 1 of this embodiment constructed as described above has substantially similar actions and effects to the embodiment of FIGS. 22 through 24 except for the holding prevention mechanism. Particularly, in this embodiment, the driven rotor 25 of the clutch 81 is formed integrally with the worm shaft 56. This contributes to a reduction in the number of parts, simplification of manufacturing steps, and reduction in the manufacturing cost, as compared with the case where the driven rotor 25 and the worm shaft 56 are formed respectively as separate parts.

For coupling the driven rotor 25 and the worm shaft 56 formed as separate parts to each other, misalignment is likely to occur between both parts 25, 56. However, no misalignment occurs between the integrally formed driven rotor 25 and worm shaft 56, thereby avoiding the occurrence of strange noise and vibrations resulting from the misalignment.

Supposing that the driven rotor 25 and the worm shaft 56 are separate parts, the driven rotor 25 must be coupled in alignment with the worm shaft 56 previously incorporated in the unit housing 91, at the same time the clutch housing 82 is attached to the unit housing 91, resulting in a significant trouble. Moreover, the worm shaft 56 can come off the unit housing 91 before the clutch housing 82 is attached to the unit housing 91. On the other hand, in this embodiment, in which the driven rotor 25 and the worm shaft 56 are integrated into a single part, the driven rotor 25 need not be aligned with the worm shaft 56 when the clutch housing 82 is attached to the unit housing 91. In addition, since the clutch housing 82 is attached to the unit housing 91 at the same time the worm shaft 56 is mounted to the unit housing 91, the worm shaft 56 will not come off. Consequently, the assembling work is facilitated.

Ninth Embodiment

Next, a ninth embodiment of the present invention will be described with reference to FIGS. 29 through 32. This embodiment shows a further example of modifications to the clutch. A driving apparatus, to which the clutch of this embodiment is applied, may be any of the aforementioned driving apparatus illustrated in the embodiments of FIGS. 1 through 28. Therefore, parts other than the clutch are indicated with the reference numerals used in the embodiments of FIGS. 1 through 28.

Figure 29:
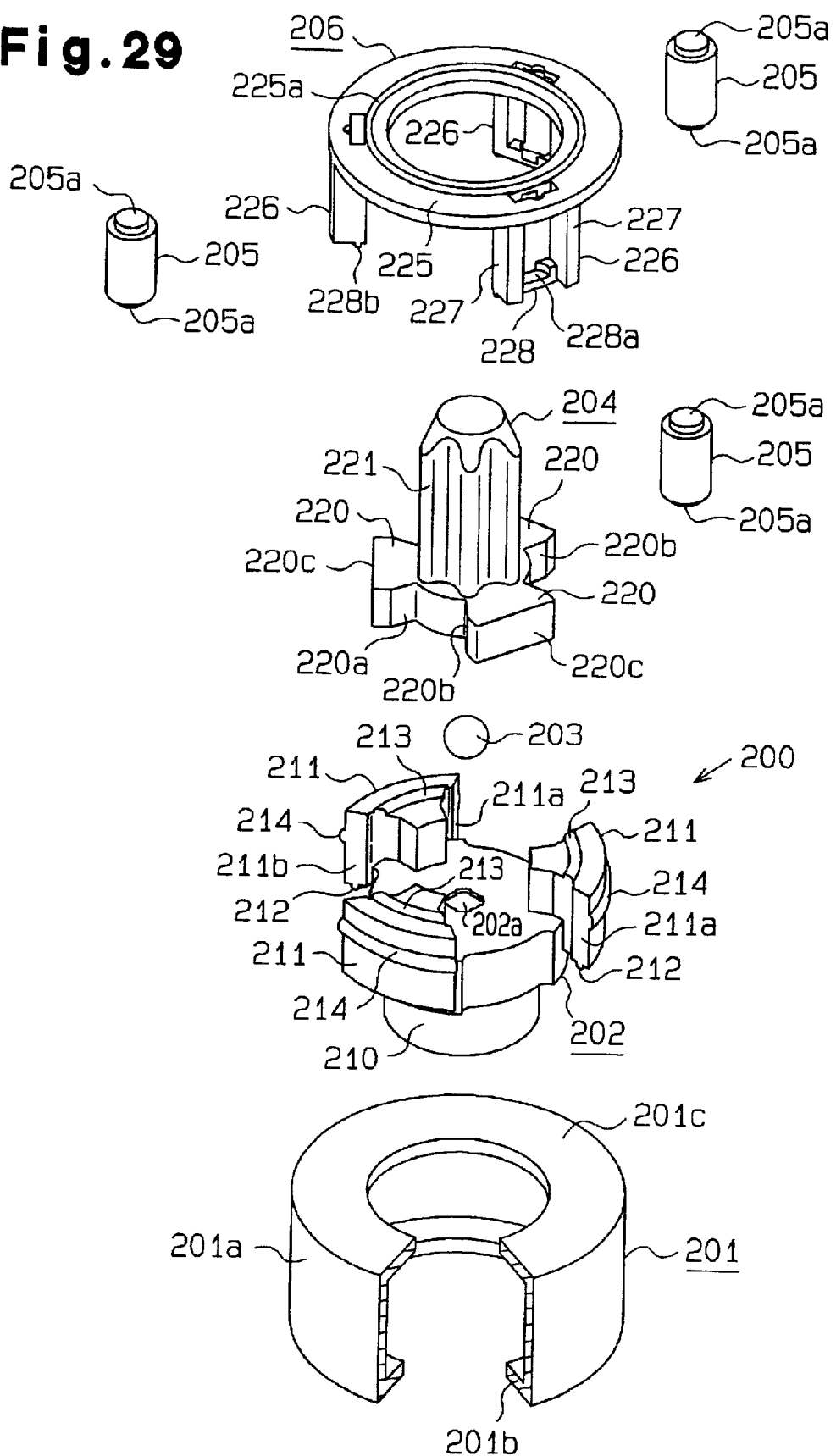
FIG. 29 is an exploded perspective view illustrating a clutch according to a ninth embodiment of the present invention.
Figure 30:
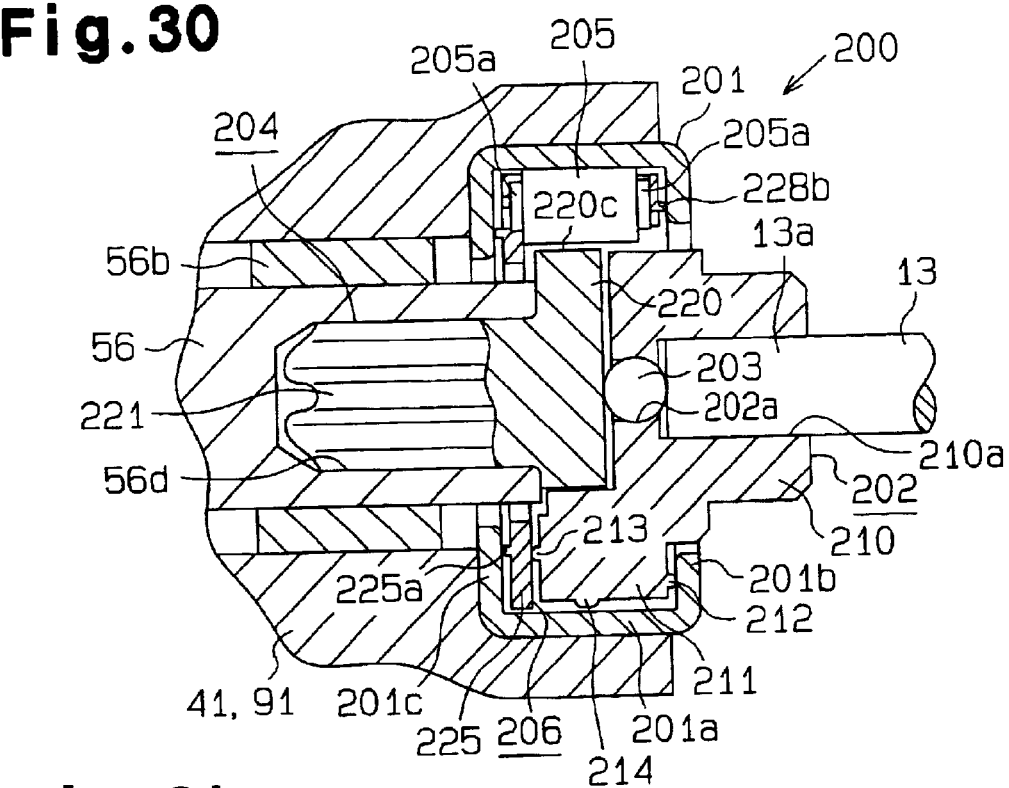
FIG. 30 is a cross-sectional view of the clutch of FIG. 29.

As illustrated in FIGS. 29 and 30, a clutch 200 of this embodiment basically has the same structure as the clutch 21 illustrated in FIG. 4. Specifically, the clutch 200 comprises a clutch housing 201, a driving rotor 202, a ball 203, a driven rotor 204, a plurality (three in this embodiment) of cylindrical rollers 205, and a support member 206. The driving rotor 202, the ball 203, the driven rotor 204, the rollers 205 and the support member 206 are assembled into the clutch housing 201 in such a manner that they cannot be removed. Then, the driving apparatus is assembled using the clutch 200 previously assembled as a single unit.

As illustrated in FIG. 30, the clutch 200 is fitted into the unit housing 41 or 91, in a manner disabling the rotation relative to it, such that the rotating shaft 13 of the motor 5 is coupled to the worm shaft 56. However, as previously described in the embodiment of FIGS. 18 through 20, the clutch 200 may be attached to the motor 5, preferably, to the brush holder 16. However, unlike the embodiment of FIGS. 18 through 20, the brush holder 16 must be formed such that the clutch 200 is fitted into the brush holder 16.

As illustrated in FIGS. 29 and 30, the clutch housing 201, which is made of a metal material, comprises a cylindrical body 201a, and annular lid plates 201b, 201c located on openings at both ends of the cylindrical body 201a. The lid plates 201b, 201c are formed, for example, by bending both ends of the cylindrical body 201a toward the inside, for restricting axial movements of parts within the clutch housing 201.

The driving rotor 202, which is formed of a resin material, comprises a fitting cylinder 210 which protrudes outwardly from the lid plate 201b of the clutch housing 201. The fitting cylinder 210 has a fitting hole 210a into which the fitting portion 13a of the rotating shaft 13 is fitted. Therefore, the driving rotor 202 is coupled to the rotating shaft 13 for rotation integral therewith. The driving rotor 202 further comprises a plurality (three in this embodiment) of driving engagement bodies 211 which are arranged at equal angular intervals. Each of the driving engagement bodies 211 generally has a fan-shape, and has a first side face 211a and a second side face 211b on both circumferential sides. A slight gap is formed between the outer peripheral faces of the driving engagement bodies 211 and the inner peripheral face of the clutch housing 201.

Each of the driving engagement bodies 211 has a first convex limb 212 and a second convex limb 213 respectively extending in the circumferential direction on both faces opposite to both lid plates 201b, 201c of the clutch housing 201. Each of the driving engagement bodies 211 also has a third convex limb 214 extending in the circumferential direction on its outer peripheral face. In each of the driving engagement bodies 211, only the first convex limb 212 is in contact with the lid plate 201b, and only the third convex limb 214 is in contact with the inner peripheral face in of the clutch housing 201. Therefore, a sliding resistance between the driving rotor 202 and the clutch housing 201 is small. It should be noted that the first and third convex limbs 212, 214 may not be necessarily in contact with the clutch housing 201.

The ball 203, which is made of metal, is held in a holding hole 202a formed in the driving rotor 202.

The driven rotor 204, which is made of a metal material, is overlain on the driving rotor 202 for rotation relative to the driving rotor 202. The driven rotor 204 has a plurality (three in this embodiment) of generally fan-shaped driven engagement bodies 220 which are arranged at equal angular intervals. Each of the driven engagement bodies 220 is located between two adjacent driving engagement bodies 211. The driven rotor 204 is in contact with the ball 203. The ball 203 permits smooth relative rotation between the driven rotor 204 and the driving rotor 202. The driven rotor 204 further has a fitting shaft 221 which protrudes outwardly from the lid plate 201c of the clutch housing 201. The fitting shaft 221 is fitted into the fitting hole 56d of the worm shaft 56 such that the worm shaft 56 rotates integrally with the driven rotor 204. As previously described in the embodiment of FIGS. 25 through 28, the driven rotor 204 may be formed integrally with the worm shaft 56.

Each of the driven engagement bodies 220 has a first side face 220a opposite to the first side face 211a of the driving engagement body 211, and a second side face 220b opposite to the second side face 211b of the driving engagement body 211. Each of the driven engagement bodies 220 further has a planar restriction face 220c opposite to the inner peripheral face of the clutch housing 201.

The rollers 205 as rolling bodies, which are made of a metal material, are located between the restriction faces 220c and the inner peripheral face of the clutch housing 201 between two adjacent driving engagement bodies 211. The rollers 205 extend in parallel with the axial line of the driving rotor 202. The rollers 205 function as lock members.

The support member 206, which is made of a resin material, comprises a ring plate 225 positioned between the lid plate 201c of the clutch housing 201 and the driving engagement body 211, and three roller supports 226 axially extending from the ring plate 225 to rotatably hold the rollers 205. The roller supports 226 are arranged on the ring plate 225 at equal angular intervals.

In the driving engagement body 211, only the second convex limb 213 is in contact with the ring plate 225. Therefore, a sliding resistance between the driving rotor 202 and the ring plate 225 is small. The ring plate 225 has an annular convex limb 225a on a face opposite to the lid plate 201c of the clutch housing 201. In the ring plate 225, only the convex limb 225a is in contact with the lid plate 201c. Therefore, a sliding resistance between the ring plate 225 and the clutch housing 201 is small. These convex limbs 213, 225a may not be necessarily in contact with the opposing members 225, 201c.

Figure 31:
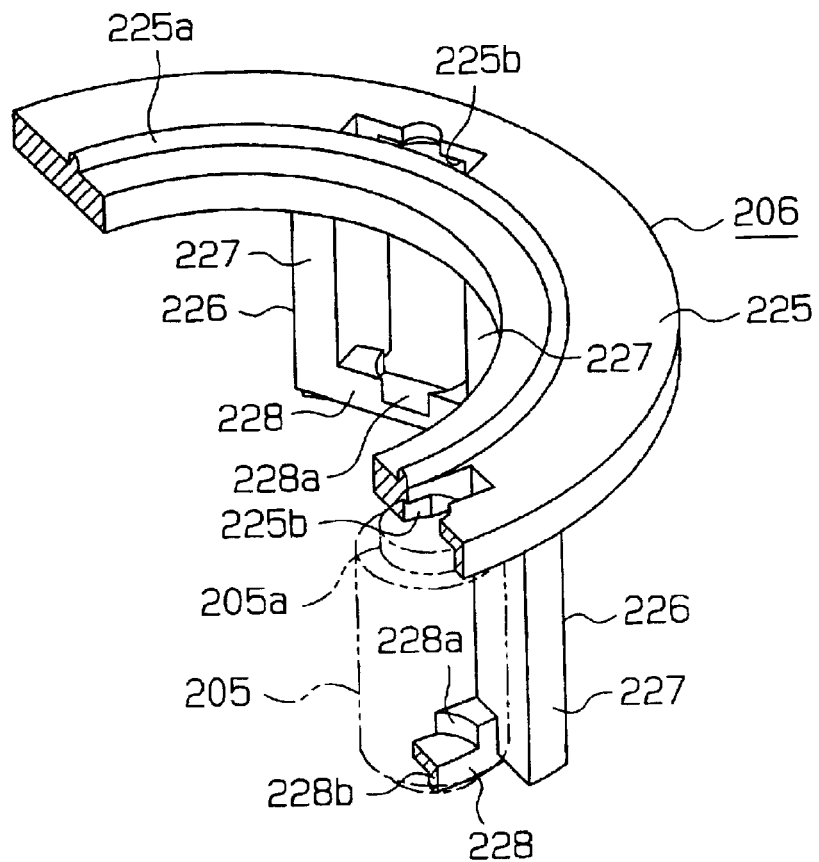
FIG. 31 is a cutaway perspective view of a support member located for the clutch of FIG. 29.

As illustrated in FIGS. 29 and 31, each of the roller supports 226 comprises a pair of holding plates 227 axially extending from the ring plate 225 and positioned at predetermined intervals in the circumferential direction, and a coupler 228 for coupling ends of both holding plates 227 to each other. The interval between both holding plates 227 is slightly larger than the diameter of the rollers 205, so that the rollers 205 are rotatably held between both holding plates 227. The roller 205 have smaller diameter portions 205a at both ends. The smaller diameter portions 205a may be tapered just like the both ends of the roller 26 illustrated in FIG. 4. The ring plate 225 has a holder 225b for rotatably holding one of the smaller diameter portions 205a, while the coupler 228 has a holder 228a for rotatably holding the other smaller diameter portion 205a. The distance between both holders 225b, 228a is slightly larger than the axial length of the rollers 205. The rollers 205 are slightly axially movable between both the holders 225b, 228a.

The coupler 228 also has a convex limb 228b extending in the circumferential direction on a face opposite to the lid plate 201b of the clutch housing 201. As illustrated in FIG. 30, in the coupler 228, only the convex limb 228b is in contact with the lid plate 201b. Therefore, a sliding resistance between the coupler 228 and the clutch housing 201 is small. The convex limb 228b may not be necessarily in contact with the lid plate 201b.

The support member 206 is rotatable relative to the clutch housing 201 with the three rollers 205 held at equal angular intervals. The rollers 205 may only be restricted in movement in the circumferential direction of the support member 206, so that its movement in the radial direction of the support member 206 may be allowed.

As illustrated in FIG. 32(a), as the driving rotor 202 rotates in the clockwise direction, the first side face 211a of the driving engagement body 221 comes in contact with the first side face 220a of the driven engagement body 220 and the roller support 226. On the other hand, though not shown, as the driving rotor 202 rotates in the counter clockwise direction, the second side face 211b of the driving engagement body 211 comes in contact with the second side face 220b of the driven engagement body 220 and the roller support 226. In this event, as has been explained also with reference to FIGS. 7(a) and 7(b), the roller 205 is brought into a state in which it is not held between the inner peripheral face of the clutch housing 201 and the restriction face 220c of the driven engagement body 220, i.e., in the free state. Thus, the driven rotor 204 can rotate relative to the clutch housing 201, as it is pressed by the driving rotor 202. Likewise, the support member 206 rotates relative to the clutch housing 201 as it is pressed by the driving engagement body 211. The three rollers 205 held by the support member 206 circulate about the axial center of the driving rotor 202 while their relative positional relationship is held.

As illustrated in FIG. 32(b), as the driven rotor 204 itself rotates in the clockwise direction, the restriction face 220c moves toward the roller 205 such that the roller 205 is held between the restriction face 220c and the inner peripheral face of the clutch housing 201. Though not particularly shown, the same is true when the driven rotor 204 itself rotates in the counter clockwise direction. In this way, when the driven rotor 204 itself rotates, the roller 205 is brought into the lock state, as has been explained also with reference to FIGS. 8(a) and 8(b). Therefore, the rotation of the driven rotor 204 relative to the clutch housing 201, in other words, the unit housing 41 or 91 is blocked.

Since the operation when the roller 205 transits from the lock state to the free state is substantially similar to the operation explained with reference to FIGS. 9(a), 9(b), 10(a) and 10(b), explanation thereon is omitted.

As described above in detail, in this embodiment, the clutch 200 is previously assembled as a single unit, and the driving apparatus is assembled using the clutch 200 as a unit item. For this reason, the assembly of the driving apparat us can be facilitated, and the clutch 200 is readily managed.

Vibrations produced in the clutch 200 can be suppressed by the unit housing 41 or 91 which surrounds the clutch 200. In addition, if a buffer member such as rubber is provided between the clutch 200 and the unit housing 41 or 91, the vibrations of the clutch 200 can be more effectively suppressed.

The clutch 200 comprises the support member 206 for holding the relative positional relationship between the plurality of rollers 205. Therefore, the rollers 205 are maintained constant in their positional relationship in all states including the free state, so that they will never tremble in the clutch housing 201. This ensures the transition of the rollers 205 from the free state to the lock state and the reverse transition, and prevents strange noise and vibration from occurring associated with the trembling.

The convex limbs 212, 213, 214 minimize the contact an areas of the driving rotor 202 to the clutch housing 201 and the support member 206. Also, the convex limbs 225a, 228b minimize the contact area of the support member 206 to the clutch housing 201. Therefore, the driving rotor 202 and the support member 206 can smoothly move with a small sliding resistance to the respective members opposing thereto.

Tenth Embodiment

Next, a tenth embodiment of the present invention will be described with reference to FIG. 33. This embodiment is an example of modifications to the clutch 200 in the embodiment of FIGS. 29 through 32. Specifically, as illustrated in FIG. 33, in this embodiment, the clutch housing 201 comprises a support cylinder 230 extending toward the motor 5. A bearing 231 is mounted to the support cylinder 230 for rotatably supporting the rotating shaft 13 of the motor 5. The bearing 221 is a radial bearing comprised of a slide bearing or a ball-and-roller bearing. By thus constructing, the bearing 18 (see FIG. 2) located in the brush holder 16 of the motor 5 can be omitted.

Eleventh Embodiment

Figure 34:
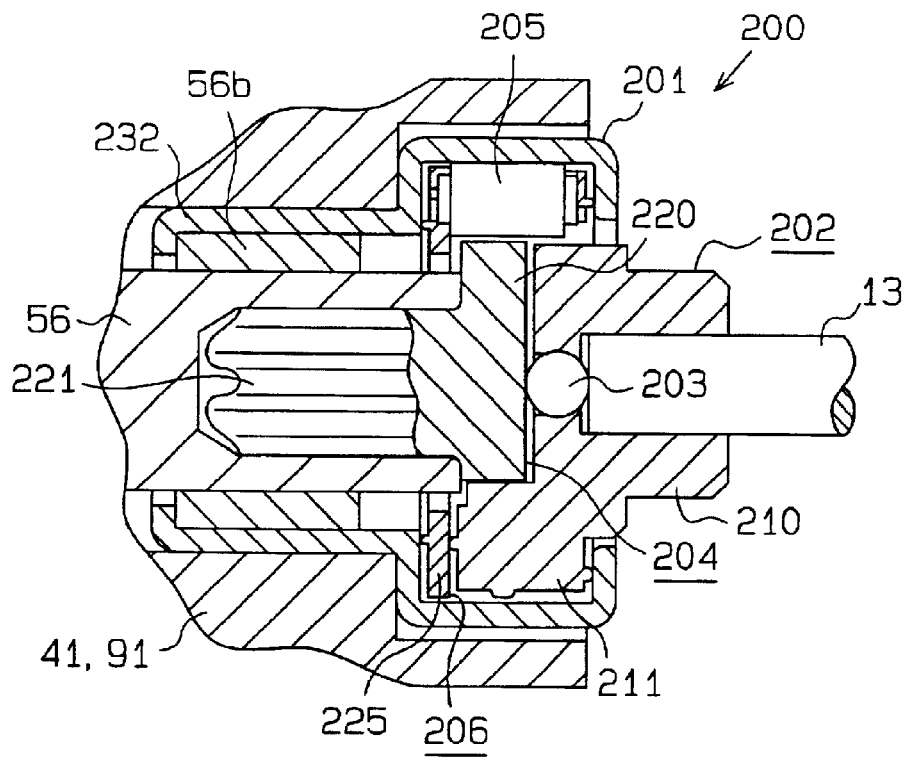
FIG. 34 is a cross-sectional view illustrating a clutch according to an eleventh embodiment of the present invention.

Next, an eleventh embodiment of the present invention will be described with reference to FIG. 34. This embodiment is an example of modifications to the clutch 200 in the embodiment of FIGS. 29 through 32. Specifically, as illustrated in FIG. 34, in this embodiment, the clutch housing 201 comprises a support cylinder 232 for mounting a slide bearing 56b for supporting one end of the worm shaft 56. The support cylinder 232 is press fitted into an insertion hole formed in the unit housing 41 or 91 for inserting the worm shaft 56 thereinto.

A clearance between the slide bearing 56b and the worm shaft 56 is extremely small. For this reason, when the slide bearing 56b has been mounted to the unit housing 41 or 91, it is difficult to perform a work for mounting the worm shaft 56 to the unit housing 41 or 91 such that it is inserted into the slide bearing 56b. However, when the slide bearing 56b has been mounted to the clutch housing 201, the worm shaft 56 can be readily inserted into the insertion hole of the unit housing 41 or 91. Moreover, since the slide bearing 56b has been previously assembled as a component of the clutch 200, the assembling work for the driving apparatus is facilitated as compared with the case where the slide bearing 56b alone is mounted to the unit housing 41 or 91.

Twelfth Embodiment

Figure 35:
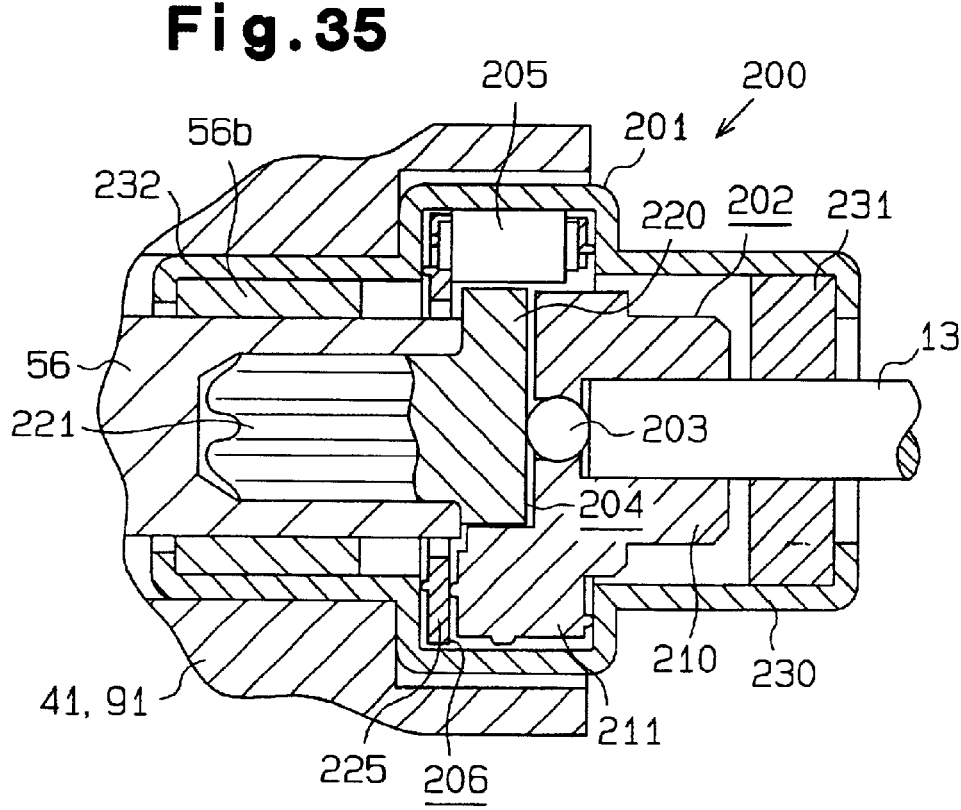
FIG. 35 is a cross-sectional view illustrating a clutch according to a twelfth embodiment of the present invention.

Next, a twelfth embodiment of the present invention will be described with reference to FIG. 35. This embodiment is a combination of the embodiment of FIG. 33 with the embodiment of FIG. 34. Specifically, as illustrated in FIG. 35, a clutch housing 201 of this embodiment comprises a support cylinder 230 for supporting the bearing 231, and a support cylinder 232 for supporting the bearing 56b.

Thirteenth Embodiment

Figure 36:
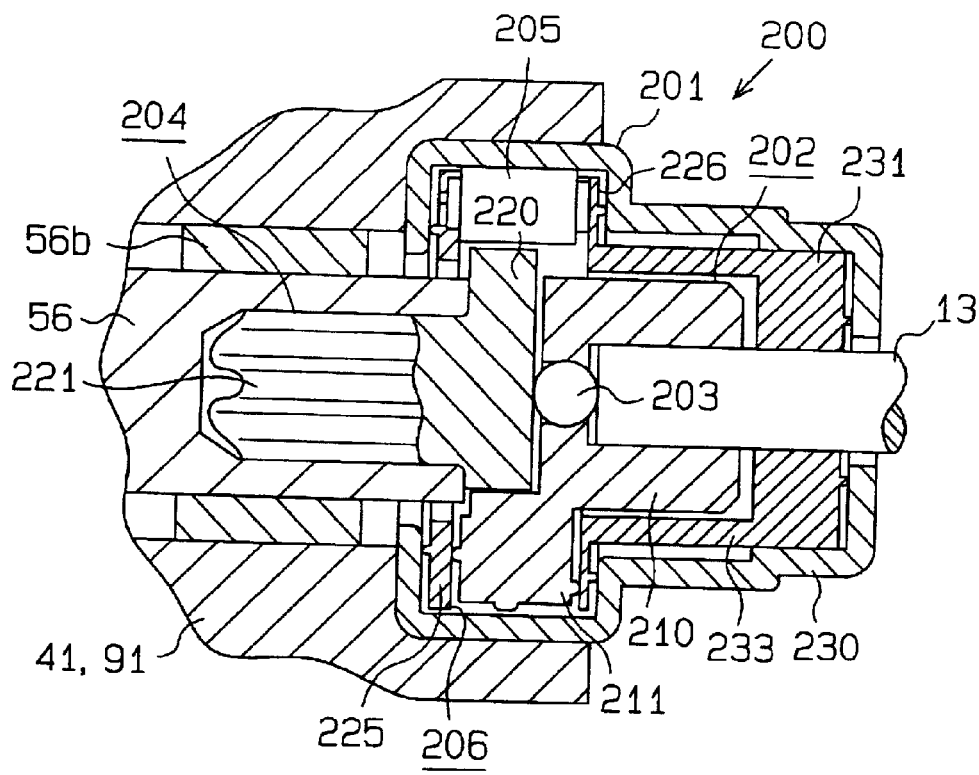
FIG. 36 is a cross-sectional view illustrating a clutch according to a thirteenth embodiment of the present invention.

Next, the thirteenth embodiment will be described with reference to FIG. 36. This embodiment is an example of modifications to the embodiment of FIG. 33. Specifically, as illustrated in FIG. 36, in this embodiment, the bearing 231 for supporting the rotating shaft 13 is formed integrally with the support member 206. The support member 206 has a coupling cylinder 233 which extends from an end of the roller support 226 to surround the fitting cylinder 210 of the driving rotor 202. The bearing 231 is connected to the coupling cylinder 233. In this way, the number of parts can be reduced to result in a reduction in the cost.

Fourteenth Embodiment

Figure 37:
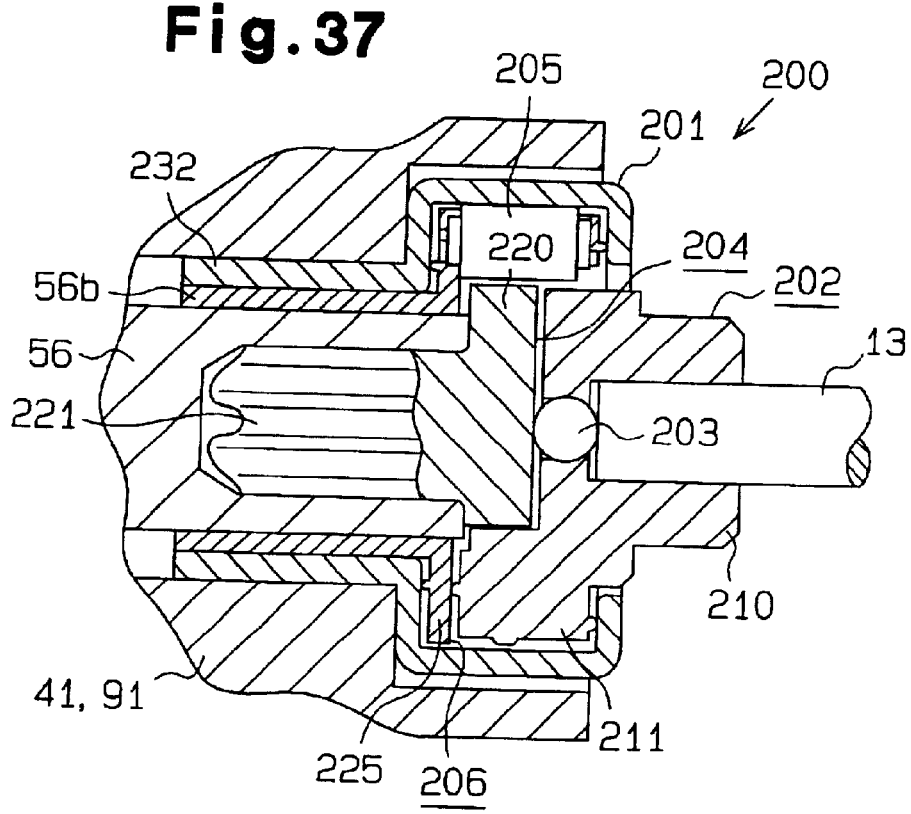
FIG. 37 is a cross-sectional view illustrating a clutch according to a fourteenth embodiment of the present invention.

Next, a fourteenth embodiment of the present invention will be described with reference to FIG. 37. This embodiment is an example of modifications to the embodiment of FIG. 34. Specifically, as illustrated in FIG. 37, in this embodiment, the bearing 56b for supporting the worm shaft 56 is formed integrally with the support member 206. The bearing 56b extends from the ring plate 225 of the support member 206. In this way, the number of parts can be reduced to result in a reduction in the cost.

Fifteenth Embodiment

Next, a fifteenth embodiment of the present invention will be described with reference to FIGS. 38 through 40. This embodiment is a further example of modifications to the clutch. A driving apparatus to which the clutch of this embodiment is applied may be any of the driving apparatus illustrated in the aforementioned embodiments of FIGS. 1 through 28. Therefore, parts other than the clutch are designated the reference numerals used in the embodiments of FIGS. 1 through 28.

Figure 38:
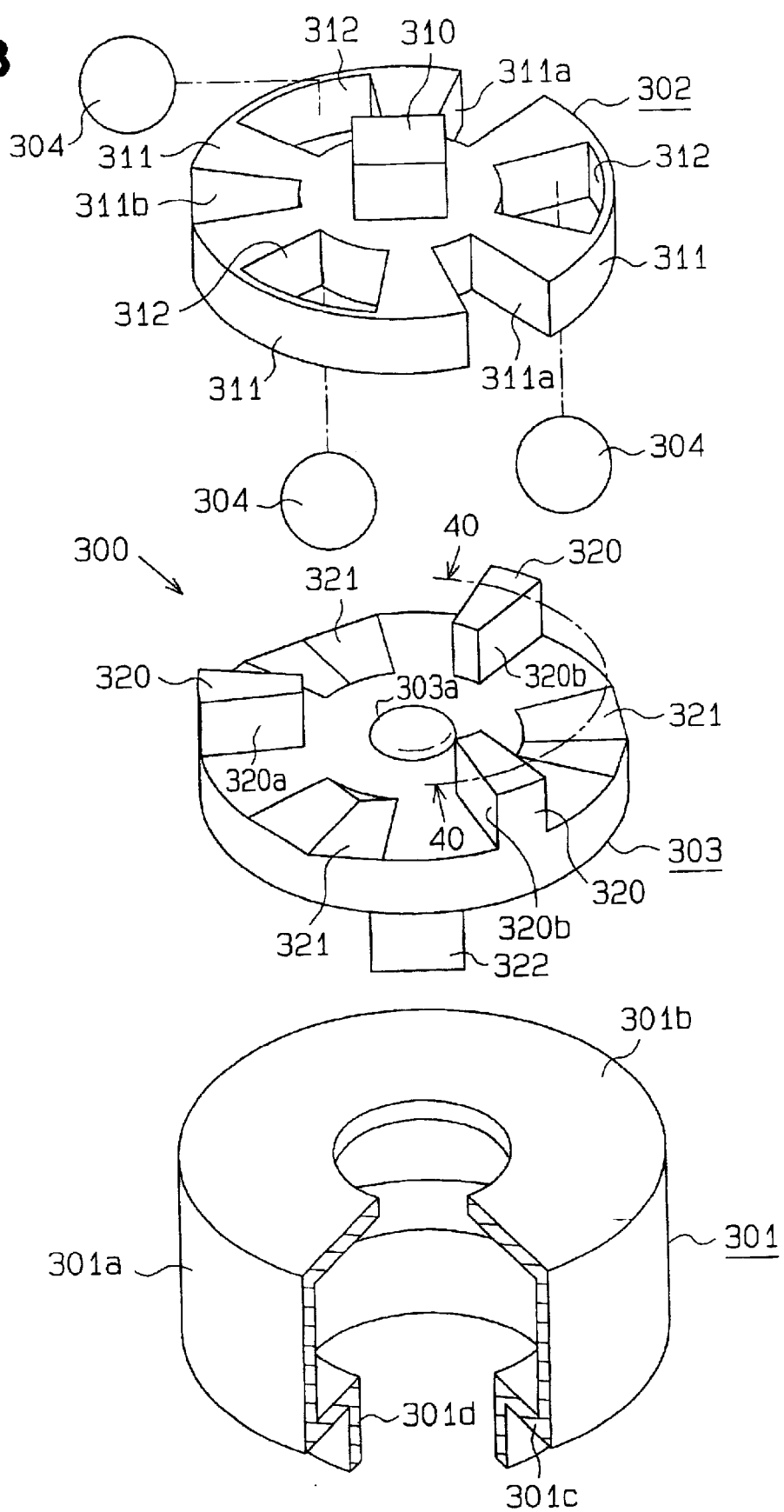
FIG. 38 is an exploded perspective view illustrating a clutch according to a fifteenth embodiment of the present invention.
Figure 39:
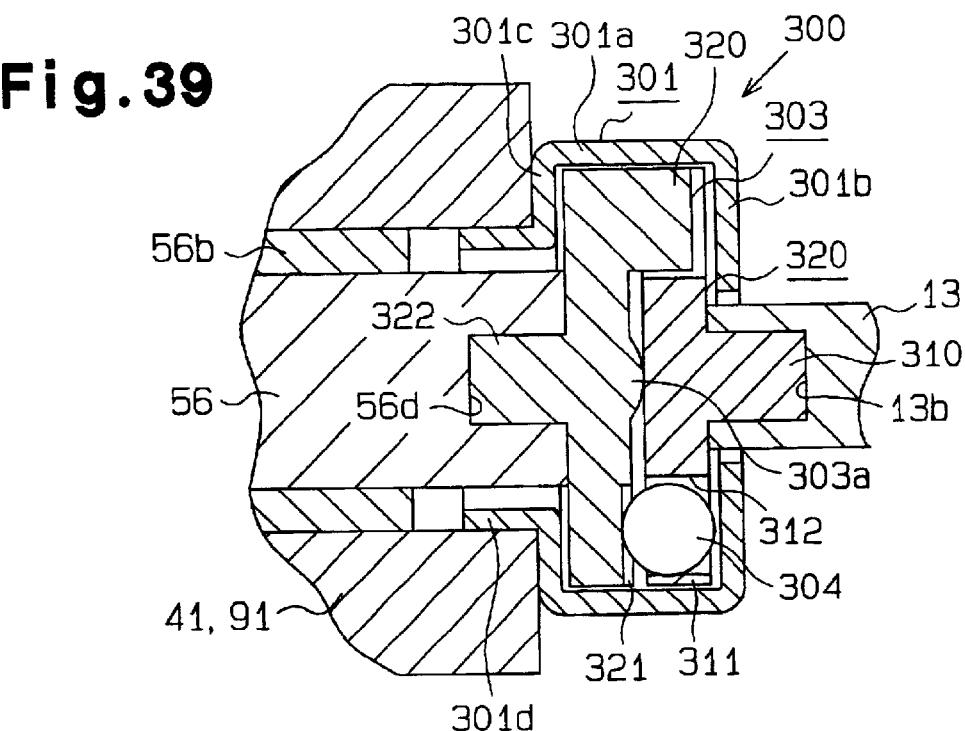
FIG. 39 is a cross-sectional view of the clutch of FIG. 38.
Figure 40:
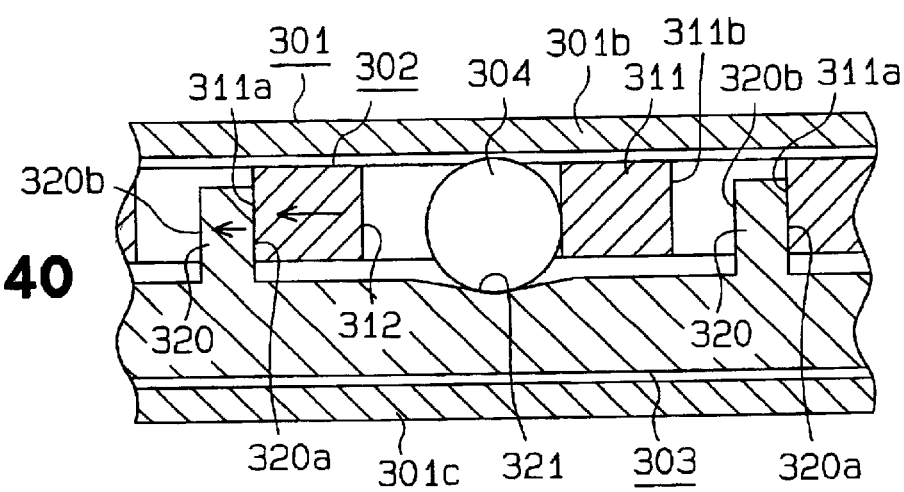
FIGS. 40(a) and 40(b) are partial cross-sectional views for explaining the operation of the clutch.
Figure 40:
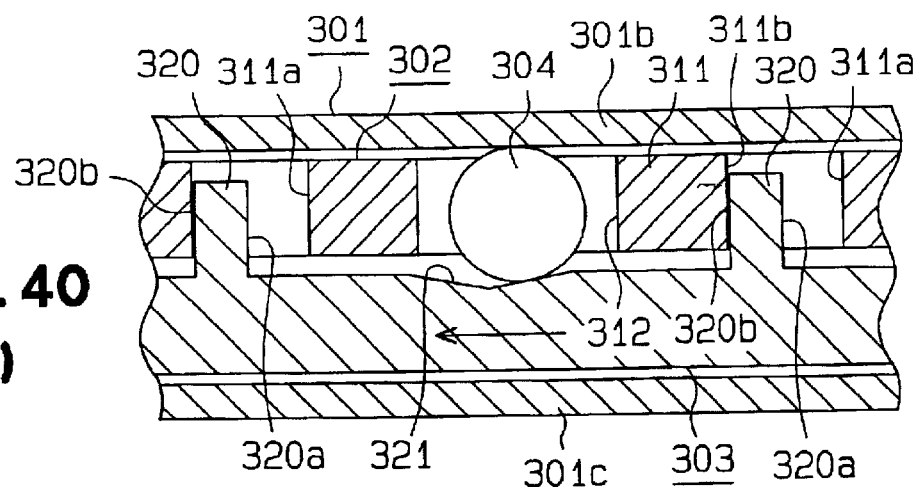

As illustrated in FIGS. 38 and 39, a clutch 300 of this embodiment comprises a clutch housing 301, a driving rotor 302, a driven rotor 303, and a plurality (three in this embodiment) of balls 304. The driving rotor 302, the driven rotor 303 and the balls 304 are assembled into the clutch housing 301 in such a manner that they cannot be removed therefrom. Then, the driving apparatus is assembled using the clutch 300 which has been previously assembled as a single unit.

As illustrated in FIG. 39, the clutch 300 is fixed to the unit housing 41 or 91 in a manner disabling the rotation relative to it to couple the rotating shaft 13 of the motor 5 to the worm shaft 56. However, as described in the embodiment of FIGS. 18 through 20, the clutch 300 may be attached to the motor 5, preferably to the brush holder 16.

As illustrated in FIGS. 38 and 39, the clutch housing 301, which is made of a metal material, comprises a cylindrical body 301a, annular lid plates 301b, 301c located at openings on both ends of the cylindrical body 301a, and a mounting cylinder 301d extending from the lid plate 301c. The lid plates 301b, 301c are formed, for example, by bending both ends of the cylindrical body 301a toward the inside, for restricting axial movements of parts within the clutch housing 301. The mounting cylinder 301d is fitted into the unit housing 41 or 91.

The driving rotor 302, which is formed of a resin material and in a generally disc-shaped shape, comprises a fitting shaft 310 protruding outward from the lid plate 301b of the clutch housing 301. The fitting shaft 310 is fitted into a hole 13b which is formed at a distal end of the rotating shaft 13. Therefore, the driving rotor 302 is coupled to the rotating shaft 13 for rotation integral therewith. The driving rotor 302 further comprises a plurality (three in this embodiment) of driving engagement bodies 311 arranged at equal angular intervals. Each of the driving engagement bodies 311 generally has a fan shape, and has a first side face 311a and second side face 311b on both circumferential sides. A slight gap is formed between the outer peripheral faces of the driving engagement bodies 311 and the inner peripheral face of the clutch housing 301.

Each of the driving engagement bodies 311 has an accommodating hole 312 at its circumferential intermediate location. The ball 304 as a rolling body is located in the accommodating hole 312. The ball 304 functions as a lock member.

The driven rotor 303, which is formed of a resin material and in a generally disc shape, is overlapped with the driving rotor 302 for rotation relative to the driving rotor 302. The driven rotor 303 is formed with a hemispherical protrusion 303a at the center thereof, and the protrusion 303a is in contact with the driving rotor 302. The protrusion 303a permits smooth relative rotation between the driven rotor 303 and the driving rotor 302.

The driven rotor 303 comprises a fitting shaft 322 which protrudes outward from the mounting cylinder 301d of the clutch housing 301. The fitting shaft 322 is fitted into the fitting hole 56d of the worm shaft 56 such that the worm shaft 56 rotates integrally with the driven rotor 303. As described in the embodiment of FIGS. 25 through 28, the driven rotor 303 may be formed integrally with the worm shaft 56.

The driven rotor 303 has a plurality (three in this embodiment) of driven engagement bodies 320 arranged at equal angular intervals. Each of the driven engagement bodies 320 is located between two adjacent driving engagement bodies. Each of the driven engagement bodies 320 has a first side face 320a opposite to the first side face 311a of the driving engagement body 311, and a second side face 320b opposite to the second side face 311b of the driving engagement body 311. The driven rotor 303 further has a V-shaped restriction face 321 which defines a V-shaped groove between the two adjacent driven engagement bodies 320. The balls 304 located in the accommodating holes 312 of the driving engagement bodies 311 are located between the restriction faces 321 and the lid plate 301b of the clutch housing 301.

FIGS. 40(a) and 40(b) are cross-sectional views illustrating a portion of the clutch 300 (a portion corresponding to a line 40—40 in FIG. 38) in development. As the driving rotor 302 in FIG. 38 rotates in the clockwise direction, the first side face 311a of the driving engagement body 311 comes in contact with the first side face 320a of the driven engagement body 320, and the inner side face of the accommodating hole 312 comes in contact with the ball 304, as illustrated in FIG. 40(a). On the other hand, though not shown, as the driving rotor 302 in FIG. 38 rotates in the counter clockwise direction, the second side face 311b of the driving engagement body 311 comes in contact with the second side face 320b of the driven engagement body 320, and the inner side face of the accommodating hole 312 comes in contact with the ball 304. In this event, as has been explained also with reference to FIGS. 7(a) and 7(b), the ball 304 is in a state in which it is not held between the lid plate 301b of the clutch housing 301 and the restriction face 321, i.e., in the free state. Therefore, the driven rotor 303 can rotate relative to the clutch housing 301 as it is pressed by the driving rotor 302. Likewise, the ball 304 circulates about the axial center of the driving rotor 302 as it is pressed by the driving rotor 302.

When the driven rotor 303 itself illustrated in FIG. 38 rotates in the clockwise direction, the restriction face 321 moves toward the ball 304 such that the ball 304 is held between the restriction face 321 and lid plate 301b of the clutch housing 301, as illustrated in FIG. 40(b). Though not particularly shown, the same is true when the driven rotor 303 itself illustrated in FIG. 38 rotates in the counter clockwise direction. In this way, when the driven rotor 303 itself rotates, the balls 304 are brought into the lock state, as has been explained also with reference to FIGS. 8(a) and 8(b). Therefore, the rotation of the driven rotor 303 relative to the clutch housing 301, in other words, the unit housing 41 or 91 is blocked.

In the clutch 300 of this embodiment described above, substantially similar actions and effects can also be provided to those of the clutches in the aforementioned respective embodiments. While in this embodiment, the balls 304 are used as rolling bodies, conical rollers may be used instead of the balls 304.

The embodiments of the present invention are not limited to the foregoing embodiments, but may be modified in the following manner.

The clutch housing may be fixed to the output unit or the motor using fixtures such as bolts, screws or the like.

The number of slide bearings for supporting the worm shaft 56 is not limited to two but may be one or three or more. Also, not limited to the slide bearing, another type of bearing such as ball-and-roller bearing may also be used.

The rotating shaft 13 of the motor 5 and the worm shaft 56 may not be coaxially located.

The structures of the clutches in the respective foregoing embodiments of FIGS. 1 through 40 merely illustrate examples, and a clutch of any structure may be employed as long as it can be located between the rotating shaft 13 of the motor 5 and the worm shaft 56.

The driving apparatus of the present invention may be applied to driving apparatus for driving a variety of driven devices, not limited to the power window apparatus.

What is claimed is:

1. A driving apparatus for driving a driven device, comprising:
    a motor including a rotating shaft;
    an output unit coupled to the motor, wherein the output unit includes a decelerating mechanism for transmitting rotation of the rotating shaft, after decelerating, to the driven device, and wherein the decelerating mechanism is a worm gear mechanism including a worm shaft separated from the rotating shaft and a worm wheel meshed with the worm shaft; and
    a clutch located between the rotating shaft and the worm shaft, wherein the clutch allows transmission of rotation from the rotating shaft to the worm shaft and block transmission of rotation from the worm shaft to the rotating shaft, wherein the clutch includes:
        a driving rotor coupled to the rotating shaft for rotation integral therewith;
        a driven rotor coupled to the worm shaft for rotation integral therewith, wherein the driven rotor is operatively coupled to the driving rotor;

a spherical member located between the driven rotor and the driving rotor to prevent the driven rotor from being pressed against the driving rotor in the axial direction of the driven rotor, and a lock member for selectively allowing and blocking the rotation of the driven rotor, wherein the lock member comprises a plurality of rolling bodies for circulating about an axial center of the driving rotor to the accompaniment of rotation of the driving rotor.

2. The driving apparatus according to claim 1, wherein the clutch includes a compensating mechanism for compensating the misalignment between the rotating shaft and the worm shaft.

3. The driving apparatus according to claim 1, wherein the clutch functions to block a movement of the decelerating mechanism based on force applied to the driven device.

4. The driving apparatus according to claim 1, wherein the output unit comprises a unit housing for accommodating the worm gear mechanism, wherein the clutch comprises a clutch housing for accommodating at least the driven rotor and the lock member, wherein the clutch housing is fixed to the unit housing such that the clutch housing does not rotate relative to the unit housing.

5. The driving apparatus according to claim 4, wherein the clutch includes a compensating mechanism, wherein the compensating mechanism allows the driving rotor to move in the radial direction relative to the clutch housing, thereby compensating the misalignment between the rotating shaft and the worm shaft.

6. The driving apparatus according to claim 4, wherein the lock member is located between the driven rotor and the clutch housing to be selectively held between and released from the driven rotor and the clutch housing, wherein, when the lock member is held between the driven rotor and the clutch housing, the lock member blocks rotation of the driven rotor relative to the clutch housing, and wherein, when the lock member is released from the driven rotor and the clutch housing, the lock member allows rotation of the driven rotor relative to the clutch housing.

7. The driving apparatus according to claim 4, wherein the lock member is located between the driven rotor and the clutch housing to be selectively held between and released from the driven rotor and the clutch housing wherein, when the lock member is held between the driven rotor and the clutch housing, the clutch blocks transmission of rotation from the worm shaft to the rotating shaft, and wherein, the when the lock member is released from the driven rotor and the clutch housing, the clutch allows transmission of rotation from the rotating shaft to the worm shaft.

8. The driving apparatus according to claim 4, wherein the driven rotor is formed integrally with the worm shaft.

9. The driving apparatus according to claim 4, wherein a bearing for supporting the rotating shaft is attached to the clutch housing.

10. The driving apparatus according to claim 4, wherein the clutch housing accommodates the driving rotor, the driven rotor and the lock member so that the clutch is assembled as a single unit.

11. The driving apparatus according to claim 1, wherein the output unit comprises a unit housing for accommodating the worm gear mechanism, wherein the motor comprises:

a motor housing for supporting the rotating shaft;

a commutator fixed on the rotating shaft;

a brush holder located between the motor housing and the unit housing; and a brush attached to the brush holder such that the brush is in contact with the commutator, wherein the brush holder is located between the clutch and the brush to separate the clutch from the brush.

12. The driving apparatus according to claim 11, wherein the motor housing has an open end into which the brush holder is fitted.

13. The driving apparatus according to claim 11, wherein the clutch comprises a clutch housing for accommodating the driving rotor, the driven rotor and the lock member, wherein the clutch housing is fixed to the brush holder such that the clutch housing does not rotate relative to the brush holder.

14. The driving apparatus according to claim 1, wherein the driving rotor is made of a resin material, and the driven rotor is made of a metal material.

15. The driving apparatus according to claim 1, wherein the clutch includes a support member for supporting the rolling bodies to hold a relative positional relationship of the rolling bodies.

16. The driving apparatus according to claim 15, wherein a bearing for supporting the rotating shaft is arranged integral with the support member.

17. The driving apparatus according to claim 15, wherein a bearing for supporting the worm shaft is arranged integral with the support member.

18. The driving apparatus according to claim 1, wherein the spherical member is a ball that is received by the driving rotor, and the driven rotor contacts the ball in the axial direction of the driven rotor.

19. The driving apparatus according to claim 1, wherein the driven device is a lifting mechanism for moving up and down a windowpane.

20. A driving apparatus for driving a driven device, comprising:

a motor including a rotating shaft;

an output unit coupled to the motor, wherein the output unit includes a decelerating mechanism for transmitting rotation of the rotating shaft, after decelerating, to the driven devices, and wherein the decelerating mechanism is a worm gear mechanism including a worm shaft separated from the rotating shaft and a worm wheel meshed with the worm shaft; and a clutch located between the rotating shaft and the worm shaft, wherein the clutch allows transmission of rotation from the rotating shaft to the worm shaft and blocks transmission of rotation from the worm shaft to the rotating shaft, wherein the clutch includes:

a driving rotor coupled to the rotating shaft for rotation integral therewith;

a driven rotor coupled to the rotating shaft for rotation integral therewith, wherein the driven rotor is operatively coupled to the driving rotor; and a lock member for selectively allowing and blocking the rotation of the driven rotor, wherein the lock member comprises a plurality of rolling bodies for circulating about an axial center of the driving rotor to the accompaniment of rotation of the driving rotor, wherein the driven rotor contacts an end face of the rotating shaft through a ball in the axial direction of the driven rotor, and the driven rotor can directly contact the driving rotor in the rotating direction of the driven rotor.

21. A driving apparatus for driving a driven device, comprising;

a motor including a rotating shaft;

an output unit coupled to the motor, wherein the output unit includes a decelerating mechanism for transmitting rotation of the rotating shaft, after decelerating, to the driven device, and wherein the decelerating mechanism is a worm gear mechanism including a worm shaft separated from the rotating shaft and a worm wheel meshed with the worm shaft; and a clutch located between the rotating shaft and the worm shaft, wherein the clutch allows transmission of rotation from the rotating shaft to the worm shaft and blocks transmission of rotation from the worm shaft to the rotating shaft, wherein the clutch includes;

a driving rotor coupled to the rotating shaft for rotation integral therewith;

a driven rotor coupled to the worm shaft for rotation integral therewith, wherein the driven rotor is operatively coupled to the driving rotor; and a lock member for selectively allowing and blocking the rotation of the driven rotor, wherein the lock member comprises a plurality of rolling bodies for circulating about an axial center of the driving rotor to the accompaniment of rotation of the driving rotor, wherein the driven rotor has a hemispherical protrusion, the driven rotor contacts an end face of the rotating shaft through the hemispherical protrusion in the axial direction of the driven rotor, and the driven rotor can directly contact the driving rotor in the rotating direction of the driven rotor.

22. A driving apparatus for driving a driven device, comprising:

a motor including a rotating shaft;

an output unit coupled to the motor, wherein the output unit includes a decelerating mechanism for transmitting rotation of the rotating shaft, after decelerating, to the driven device, and wherein the decelerating mechanism is a worm gear mechanism including a worm shaft separated from the rotating shaft and a worm wheel meshed with the worm shaft;

a clutch located between the rotating shaft and the worm shaft, wherein the clutch allows transmission of rotation from the rotating shaft to the worm shaft and blocks transmission of rotation from the worm shaft to the rotating shaft; and a ball located between an end face of the rotating shaft and the clutch.

23. A driving apparatus for driving a driven device, comprising:

a motor, wherein the motor includes:

a rotating shaft;

a motor housing for supporting the rotating shaft, wherein the motor housing has an open end;

a commutator fixed on the rotating shaft and located in the motor housing;

a brush holder fitted into the open end of the motor housing to define a first space in the motor housing wherein the commutator is located in the first space, and wherein the brush holder has a through hole through which the rotating shaft extends; and a brush attached to the brush holder, wherein the brush is located in the first space and is in contact with the commutator, an output unit coupled to the motor and facing the brush holder, wherein the output unit includes a decelerating mechanism and a unit housing for accommodating the decelerating mechanism, wherein the decelerating mechanism its rotation of the rotating shaft, after decelerating, to the driven device and wherein the decelerating mechanism is a worm gear mechanism including a worm shaft separated from the rotating shaft and a worm wheel meshed with the worm shaft, wherein a second space is defined between the unit housing and the brush holder; and a clutch, which is located in the second space and between the rotating shaft and the worm shaft, wherein the clutch allows transmission of rotation from the rotating shaft to the worm shaft and blocks transmission of rotation from the worm shaft to the rotating shaft, wherein the clutch includes:

a driving rotor coupled to the rotating shaft for rotation integral therewith;

a driven rotor coupled to the worm shaft for rotation integral therewith, wherein the driven rotor is operatively coupled to the driving rotor;

a lock member for selectively allowing and blocking the rotation of the driven rotor, wherein the lock member comprises a plurality of rolling bodies for circulating about an axial center of the driving rotor to the accompaniment of rotation of the driving rotor; and a clutch housing for accommodating at least the driven rotor and the lock member, wherein the brush holder is located between the first and second spaces to separate the first space from the second space, and wherein the brush holder supports the rotating shaft with a bearing so that the bearing shuts a space between the rotating shaft and a wall of the through hole.

24. The driving apparatus according to claim 23, wherein the clutch functions to block a movement of the decelerating mechanism based on force applied to the driven device.

25. The driving apparatus according to claim 23, wherein the clutch housing is fixed to the unit housing such that the clutch housing does not rotate relative to the unit housing.

26. The driving apparatus according to claim 23, wherein the clutch housing is fixed to the brush holder such that the clutch housing does not rotate relative to the brush holder.

27. The driving apparatus according to claim 23, wherein the lock member is located between the driven rotor and the clutch housing to be selectively held between and released from the driven rotor and the clutch housing, wherein, when the lock member is held between the driven rotor and the clutch housing, the lock member blocks rotation of the driven rotor relative to the clutch housing, and wherein, when the lock member is released from the driven rotor and the clutch housing, the lock member allows rotation of the driven rotor relative to the clutch housing.

28. The driving apparatus according to claim 23, wherein the lock member is located between the driven rotor and the clutch housing to be selectively held between and released from the driven rotor and the clutch housing, wherein, when the lock member is held between the driven rotor and the clutch housing, the clutch blocks transmission of rotation from the worm shaft to the rotating shaft, and wherein, when the lock member is released from the driven rotor and the clutch housing, the clutch allows transmission of rotation from the rotating shaft to the worm shaft.

29. The driving apparatus according to claim 23, wherein the driven rotor is formed integrally with the worm shaft.

30. The driving apparatus according to claim 23, wherein a bearing for supporting the rotating shaft is attached to the clutch housing.

31. The driving apparatus according to claim 23, wherein a spherical member located between the driven rotor and the driving rotor to prevent the driven rotor from being pressed against the driving rotor in the axial direction of the driven rotor.

32. The driving apparatus according to claim 23, wherein the clutch comprises a support member for supporting the rolling bodies to hold a relative positional relationship of the rolling bodies.

33. The driving apparatus according to claim 32, wherein a bearing for supporting the rotating shaft is arranged integral with the support member.

34. The driving apparatus according to claim 32, wherein a bearing for supporting the worm shaft is arranged integral with the support member.

35. The driving apparatus according to claim 23, wherein the clutch housing accommodates the driving rotor, the driven rotor and the lock member so that the clutch is assembled as a single unit.

36. The driving apparatus according to claim 23, wherein the driving rotor is made of a resin material, and the driven rotor is made of a metal material.

37. The driving apparatus according to claim 23, wherein the driven rotor contacts an end face of the rotating shaft through a ball in the axial direction of the driven rotor, and the driven rotor can directly contact the driving rotor in the rotating direction of the driven rotor.

38. The driving apparatus according to claim 23, wherein the driven rotor has a hemispherical protrusion, the driven rotor contacts an end face of the rotating shaft through the hemispherical protrusion in the axial direction of the driven rotor, and the driven rotor can directly contact the driving rotor in the rotating direction of the driven rotor.

39. The driving apparatus according to claim 23, wherein a ball is received by the driving rotor, and the driven rotor contacts the ball in the axial direction of the driven rotor.

40. The driving apparatus according to claim 23, wherein a ball is located between an end face of the rotating shaft and the clutch.

41. The driving apparatus according to claim 23, wherein the driven device is a lifting mechanism for moving up and down a windowpane.

42. The driving apparatus according to claim 23, wherein the rotating shaft has a proximal end and a distal end, wherein the bearing is a first bearing for supporting the distal end of the rotating shaft, wherein a second bearing is located in the motor housing and supports the proximal end of the rotating shaft,
wherein the worm shaft has a proximal end and a distal end, wherein a third bearing is located in the unit housing and supports the distal end of the worm shaft and wherein a fourth bearing is located in the unit housing and supports the proximal end of the worm shaft.

43. The driving apparatus according to claim 42, wherein the clutch is located between the first bearing and the third bearing and compensates the misalignment between the distal ends of the rotating shaft and the worm shaft.

44. The driving apparatus according to claim 43, wherein the clutch includes a clutch housing fixed to one of the unit housing and the brush holder.

45. A driving apparatus for driving a driven device, comprising:
a motor including a rotating shaft;
an output unit coupled to the motor, wherein the output unit includes a decelerating mechanism for transmitting rotation of the rotating shaft, after decelerating, to the driven device, and wherein the decelerating mechanism is a worm gear mechanism including a worm shaft separated from the rotating shaft and a worm wheel meshed with the worm shaft; and
a clutch located between the rotating shaft and the worm shaft, wherein the clutch includes:
a driving rotor coupled to the rotating shaft for rotation integral therewith;
a driven rotor coupled to the worm shaft for rotation integral therewith, wherein, when the driving rotor rotates, the driving rotor directly contacts the driven rotor in the rotating direction of the driving rotor,
a lock member for selectively allowing and blocking the rotation of the driven rotor, wherein the lock member comprises a plurality of rolling bodies for circulating about an axial center of the driving rotor to the accompaniment of rotation of the driving rotor;
a support member for supporting the rolling bodies to hold a relative positional relationship of the roller bodies, wherein the support member includes a ring plate and a plurality of roller supports axially extending from the ring plate to rotatably hold the rolling bodies, wherein the support member is movable relative to the driving and driven rotors; and
a clutch housing for accommodating at least the driven rotor, the lock member and the support member, wherein the lock member is located between the driven rotor and the clutch housing to be selectively held between and released from the driven rotor and the clutch housing, wherein when the lock member is held between the driven rotor and the clutch housing, the clutch blocks transmission of rotation from the worm shaft to the rotating shaft, and wherein, when the lock member is released from the driven rotor and the clutch housing, the clutch allows transmission of rotation from the rotating shaft to the worm shaft.

46. A driving apparatus for driving a driven device, comprising:
a motor including a rotating shaft;
an output unit coupled to the motor, wherein the output unit includes a decelerating mechanism for transmitting rotation of the rotating shaft, after decelerating, to the driven device, wherein the decelerating mechanism is a worm gear mechanism including a worm shaft separated from the rotating shaft and a worm wheel meshed with the worm shaft; and
a clutch located between the rotating shaft and the worm shaft, wherein the clutch allows transmission of rotation from the rotating shaft to the worm shaft and blocks transmission of rotation from the worm shaft to the rotating shaft, wherein the clutch includes:
a driving rotor coupled to the rotating shaft for rotation integral therewith, wherein the driving rotor has a receiving hole;
a driving rotor coupled to the worm shaft for rotation integral therewith, the driven rotor operatively coupled to the driving rotor;
a lock member for selectively allowing and blocking the rotation of the driven rotor; and
a ball, which is received by the receiving hole and is located between an end face of the rotating shaft and the driven rotor, wherein the receiving hole opens toward an end face of the rotating shaft and toward the driven rotor so that the ball contacts the end fare of the rotating shaft and the driven rotor.

47. The driving apparatus according to claim 46, wherein the output unit includes a unit housing for accommodating the decelerating mechanism, wherein the clutch has a clutch housing fixed to the unit housing, and wherein an engaging mechanism is located between the unit housing and the clutch housing for blocking rotation of the clutch housing relative to the unit housing.

48. The driving apparatus according to claim 46, wherein the motor includes a motor housing for supporting the rotating shaft, wherein the clutch has a clutch housing fixed to the motor housing, and wherein an engaging mechanism is located between the motor housing and the clutch housing for blocking rotation of the clutch housing relative to the motor housing.

49. The driving apparatus according to claim 46, wherein the driven rotor can directly contact the driving rotor in the rotating direction of the driven rotor.

* * * * *

UNITED STATES PATENT AND TRADEMARK OFFICE
CERTIFICATE OF CORRECTION

PATENT NO.     : 6,789,443 B1
DATED          : September 14, 2004
INVENTOR(S)    : Katsuhiko Torii, Hiroaki Yamamoto and Shinji Oka It is certified that error appears in the above-identified patent and that said Letters Patent is hereby corrected as shown below:

<u>Title page,</u>
Item [73], Assignee, delete "Shizouka" and insert -- Shizuoka --.

Signed and Sealed this

First Day of February, 2005

JON W. DUDAS
*Director of the United States Patent and Trademark Office*